(12) United States Patent
Honda

(10) Patent No.: US 11,650,777 B2
(45) Date of Patent: May 16, 2023

(54) DATA CONVERSION PROCESSING SYSTEM, DATA CONVERSION PROCESSING METHOD, AND NON-TRANSITORY RECORDING MEDIUM

(71) Applicant: Tadashi Honda, Kanagawa (JP)

(72) Inventor: Tadashi Honda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/592,469

(22) Filed: Feb. 3, 2022

(65) Prior Publication Data

US 2022/0317944 A1    Oct. 6, 2022

(30) Foreign Application Priority Data

Mar. 23, 2021    (JP) .............................. JP2021-049168

(51) Int. Cl.
*G06F 3/12* (2006.01)

(52) U.S. Cl.
CPC .............. *G06F 3/126* (2013.01); *G06F 3/121* (2013.01); *G06F 3/1206* (2013.01); *G06F 3/1253* (2013.01); *G06F 3/1285* (2013.01); *G06F 3/12* (2013.01)

(58) Field of Classification Search
CPC ........ G06F 3/126; G06F 3/1206; G06F 3/121; G06F 3/1253; G06F 3/1285

USPC ........................................................ 358/1.15
See application file for complete search history.

(56) References Cited

U.S. PATENT DOCUMENTS

| 9,595,061 | B1* | 3/2017 | Ryan ..................... G06F 16/258 |
| 2006/0055962 | A1 | 3/2006 | Saito |
| 2007/0067370 | A1 | 3/2007 | Honda et al. |
| 2014/0223150 | A1 | 8/2014 | Honda et al. |
| 2018/0113792 | A1* | 4/2018 | Kumagai .............. G06F 9/5005 |

FOREIGN PATENT DOCUMENTS

| JP | 2006-081081 | 3/2006 |
| JP | 2009-075689 | 4/2009 |

* cited by examiner

*Primary Examiner* — Darryl V Dottin
(74) *Attorney, Agent, or Firm* — Duft & Bornsen, PC

(57) ABSTRACT

A data conversion processing system, including: a queue server to accumulate a queue that specifies data conversion processing to a different data format; and circuitry to execute a converter that performs conversion of data specified by the queue, and a converter number adjustment module provided at a container as a user space on an operating system, wherein the converter number adjustment module, in a case that a number of queues equal to or larger than a threshold value are accumulated in the queue server, forms at least one virtual converter that performs data conversion processing the same as the data conversion processing of the converter at the container, and performs the data conversion processing corresponding to the number of queues equal to or larger than the threshold value.

20 Claims, 20 Drawing Sheets

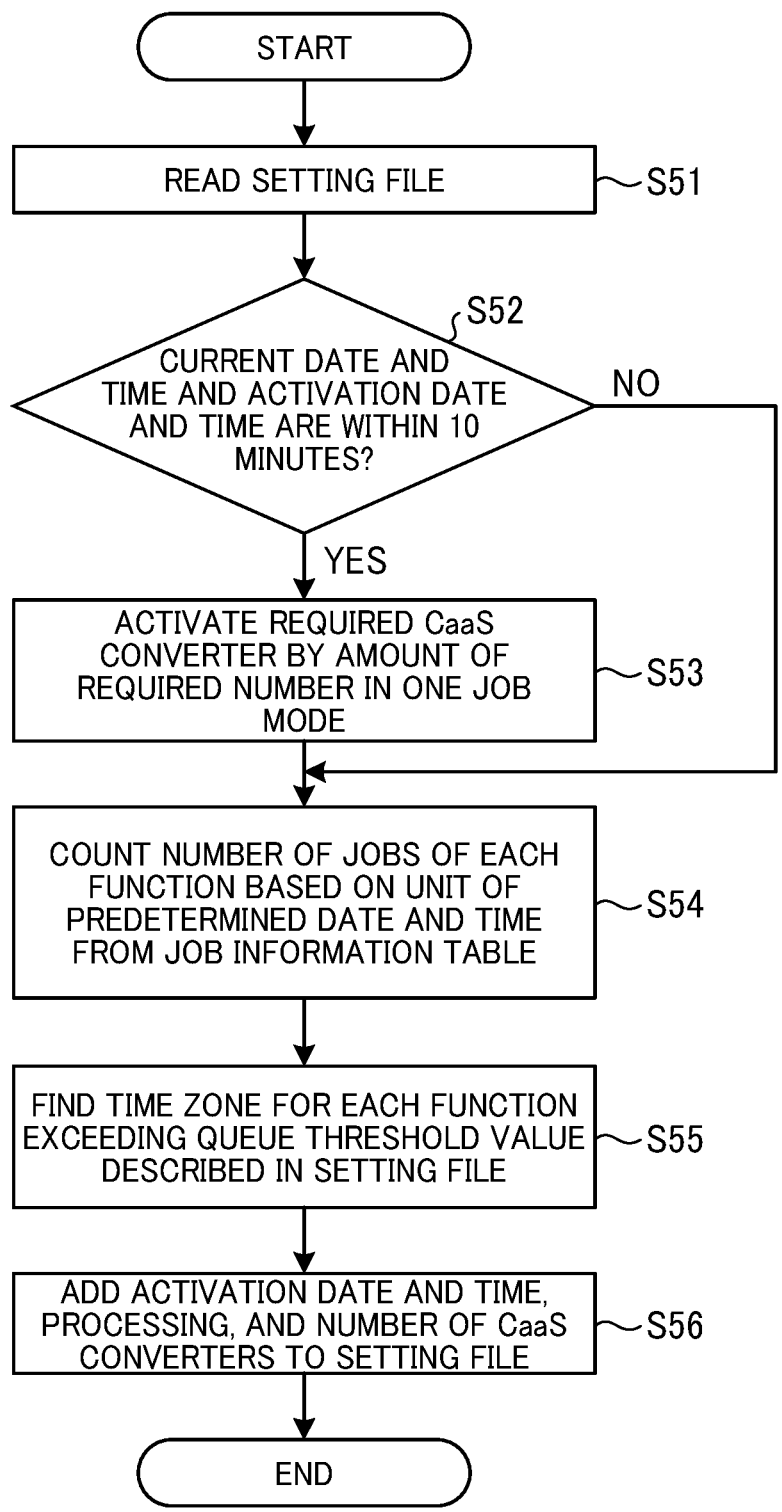

US 11,650,777 B2

DATA CONVERSION PROCESSING SYSTEM, DATA CONVERSION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-049168, filed on Mar. 23, 2021, in the Japan Patent Office, the entire disclosure of which is hereby incorporated by reference herein.

BACKGROUND

Technical Field

The present disclosure relates to a data conversion processing system, a data conversion processing method, and a non-transitory recording medium.

Description of the Related Art

An electronic document file created using a word processor application or the like is converted by a printer driver into electronic data in a data format interpretable by a printer (print data in a page description language (PDL) format), and the converted electronic data is transmitted to the printer to be output.

Moreover, for example, like a printer driver that converts an office document into print data, there is data conversion processing that converts electronic data in a certain data format into electronic data in another data format to convert the electronic data into the electronic data in the format suitable for the use at the time of outputting. The data conversion processing is not limited to the data conversion processing performed by one computer, and may be performed by a computer system using a plurality of computers.

When a certain data format is converted into another data format, a converter (a data conversion program or a data conversion library) that converts the data format is used to enhance the independency and maintainability of the program.

However, when processing is requested for a number of jobs equal to or larger than the number of jobs processable by a converter provided in advance, the processing inevitably stagnates.

SUMMARY

Example embodiments include a data conversion processing system, including: a queue server that accumulates a queue that specifies data conversion processing to a different data format; and circuitry that executes a converter that performs conversion of data specified by the queue, and a converter number adjustment module provided at a container as a user space on an operating system. The converter number adjustment module, in a case that a number of queues equal to or larger than a threshold value are accumulated in the queue server, forms at least one virtual converter that performs data conversion processing the same as the data conversion processing of the converter at the container, and performs the data conversion processing corresponding to the number of queues equal to or larger than the threshold value.

Example embodiments include a data conversion processing method, including: providing a converter number adjustment module at a container as a user space on an operating system; and based on a determination that a number of queues equal to or larger than a threshold value are accumulated in a queue server configured to accumulate a queue that specifies data conversion processing to a different data format, the method further including: forming at least one virtual converter that performs data conversion processing the same as data conversion processing of a converter that performs the data conversion processing specified by the queue, at the container using the converter number adjustment module; and performing the data conversion processing corresponding to the queues whose number has become equal to or larger than the threshold value.

Example embodiments include a non-transitory recording medium storing a program that causes one or more processors to perform the above-described data conversion processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 22 is a flowchart illustrating automatic past record check that is performed to set a schedule for automatically activating the CaaS converter according to the embodiment.

Figure 1:
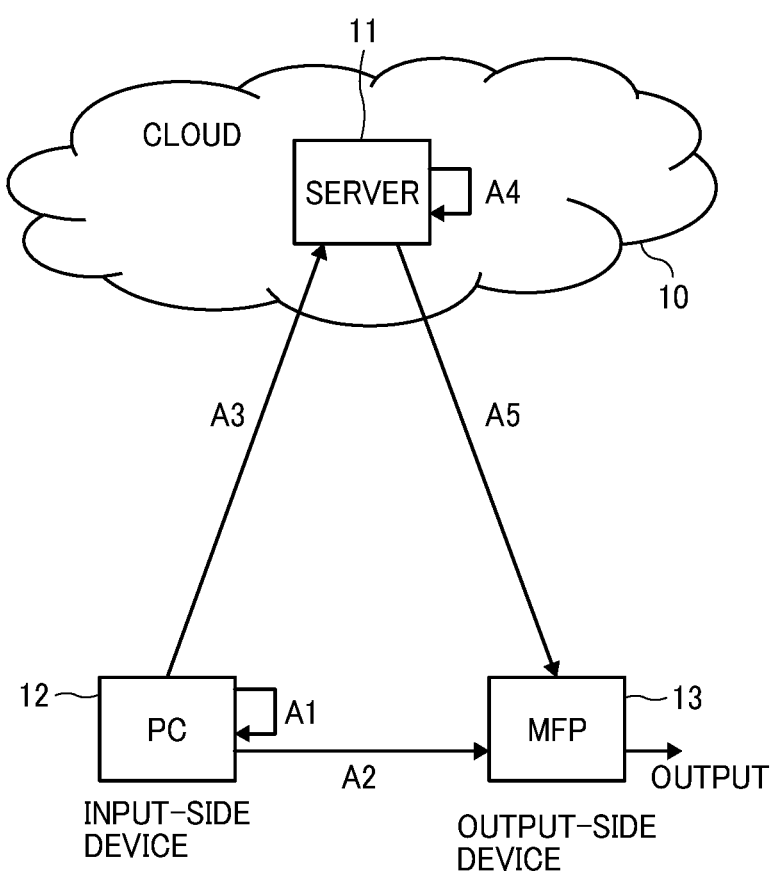
FIG. 1 illustrates a diagram illustrating example cloud print.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a", "an", and "the" are intended to include the plural forms as well, unless the context clearly indicates otherwise.

An embodiment of the present disclosure will be described below with reference to the drawings. First, a mode of use of the embodiment is described, and then functional configurations and operations of the embodiment are described.

Cloud Print

In the specification, "cloud print" is a print service of cloud computing. The concept is described referring to FIG. 1. Referring to FIG. 1, an input device (for example, a personal computer (hereinafter referred to as "PC") 12) converts an electronic document file or the like created using a word processor application into, for example, print data in Refined Printing Command Stream (RPCS) that is a page description language developed by Ricoh Co., Ltd. (A1), and the converted data is transmitted to an output device via a Universal Serial Bus (USB) or a local area network (LAN) (A2) to be output. The output device is, for example, a multifunction peripheral (hereinafter referred to as "MFP") 13.

In cloud print, a procedure of A1 is executed on a cloud 10 (A4). Specifically, the input device transmits an electronic document file to the cloud 10 (A3), and the MFP 13 receives the converted data from the cloud 10. Both the input device and the output device serve as clients when viewed from the cloud 10, and the clients communicate with a virtual server 11 on the cloud 10 to attain a given purpose.

Since a local client does not have to perform the data conversion processing of A1, the local client does not have to have a data conversion engine. However, the data conversion engine prepared on the cloud 10 is required to support a variety of electronic document files, and the types of electronic document files may increase in the future. Regarding outputting, the output device may support an output to a projector or a completely unknown device in addition to the MFP. The data format may be converted into a data format that allows connection to another cloud service. It is desirable to flexibly respond to an increase in the types of data conversion processing.

Figure 2:
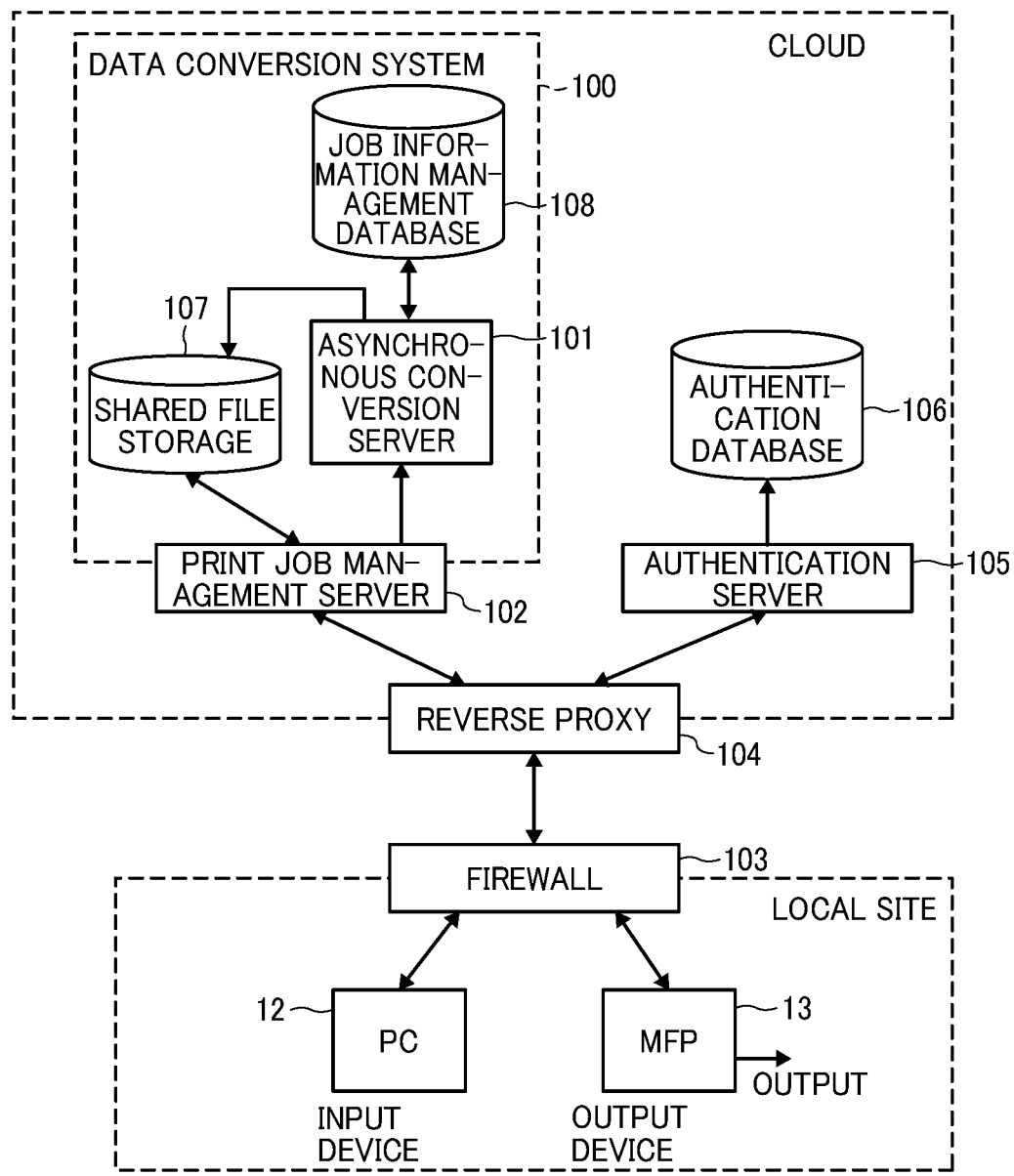
FIG. 2 is a block diagram illustrating an example of a configuration of a computer system that implements the cloud print.

The cloud print described above with reference to FIG. 1 is implemented by a cloud-computing computer system (data conversion system) illustrated in FIG. 2. Referring to FIG. 2, the general-purpose PC 12 and the MFP 13 are present on the local site, and are connected to the Internet via a firewall 103 installed in a gateway or the like of the LAN. The cloud print is effective regardless of whether the PC 12 and the MFP 13 are on the same network. In the following description, it is assumed that the devices are not on the same network. This is because the convenience of cloud print is better understood when data is not easily exchanged between the devices on the local site.

Figure 4:
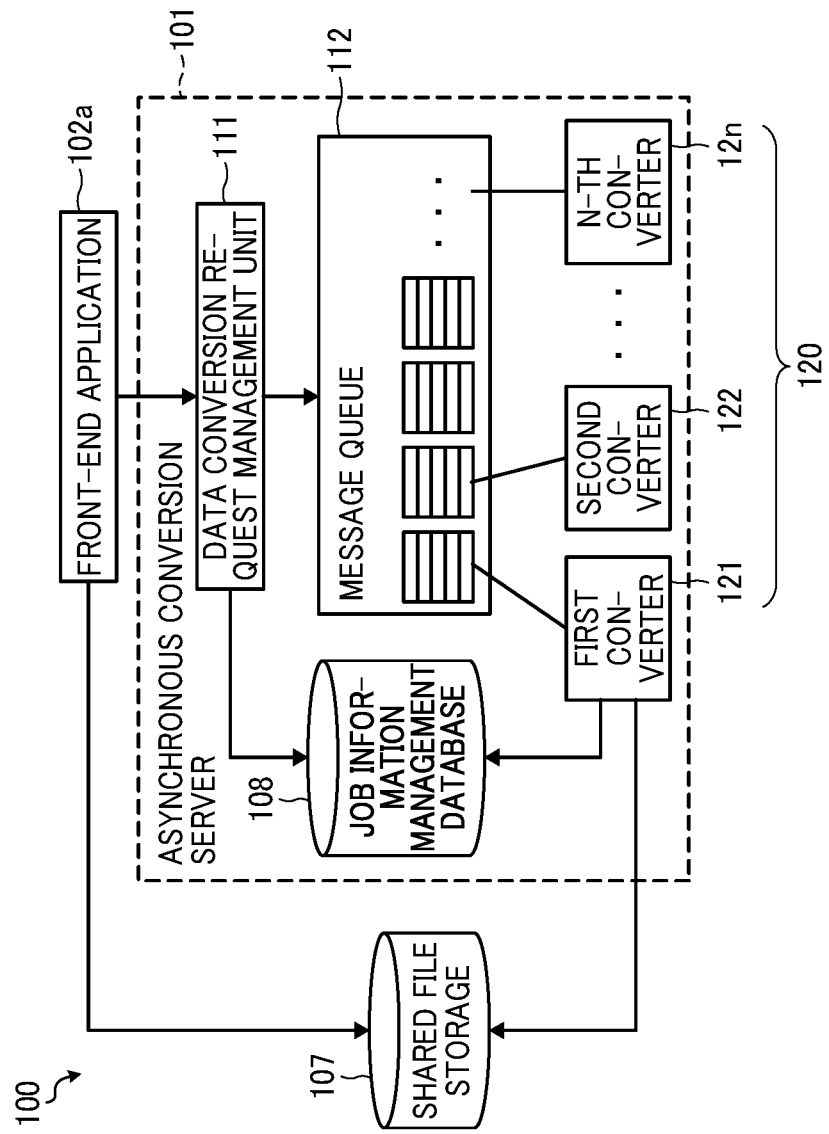
FIG. 4 is a block diagram illustrating a functional configuration of the data conversion system according to an embodiment.

Referring to FIG. 2, the cloud includes a data conversion system 100, a print job management server 102, a reverse proxy 104, an authentication server 105, and an authentication database 106. The data conversion system 100 includes an asynchronous conversion server 101, a shared file storage 107, and a job information management database 108. The shared file storage 107 may be designed to be located outside the data conversion system 100. As illustrated in FIG. 4, the job information management database 108 may be designed to be part of the asynchronous conversion server 101.

Since the communication is mediated by the reverse proxy 104, the local-site device does not have to perform processing or communication taking into consideration of the server group and the internal structure of the storage on the cloud. The authentication server 105 and the authentication database 106 authenticate at least one of a user and the local-site device. The print job management server 102 and the data conversion system 100 manage and register a print job uploaded by the local-site device. When receiving a print request from the local-site device, the print job management server 102 and the data conversion system 100 transmit print data to the local-site device.

A print job includes an electronic document file created using a word processor application or the like. The data conversion system 100 converts the electronic document file included in the print job into print data that is electronic data in a data format (page description language, PDL) that can be output by, for example, the MFP 13.

Figure 3:
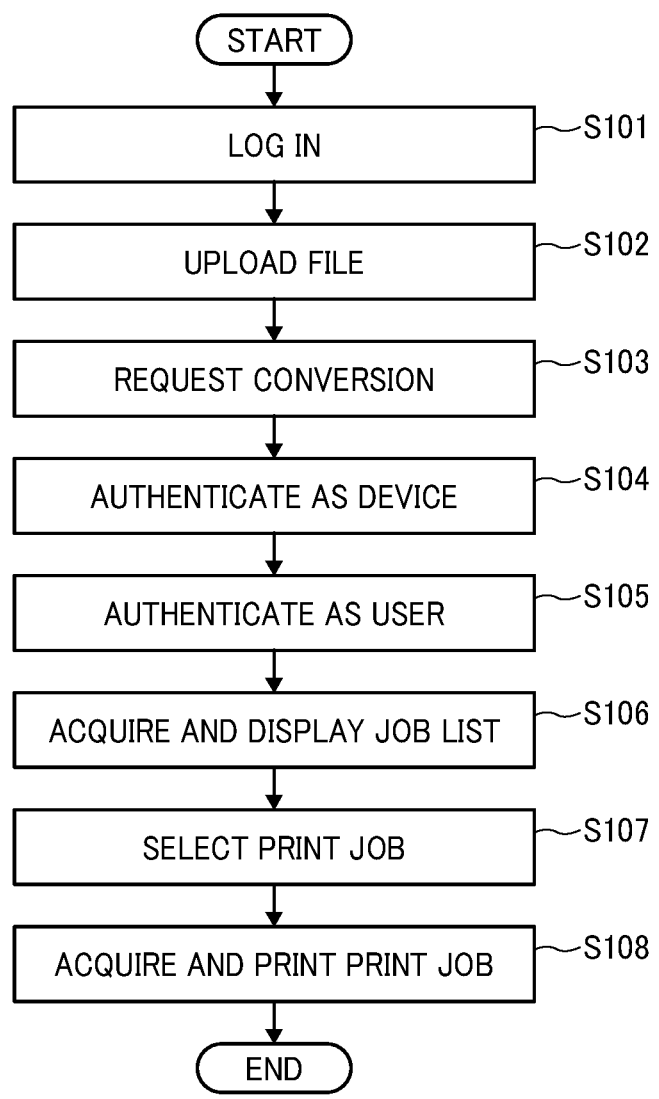
FIG. 3 is a flowchart illustrating example processing of using the cloud print of FIG. 2.

An example of use of the computer system illustrated in FIG. 2 is described referring to FIG. 3. FIG. 3 is a flowchart illustrating example processing of using the cloud print of FIG. 2. A user first logs in to the cloud print service from the PC 12 (S101). The authentication server 105 executes authentication processing. Then, the user uploads an electronic document file to be printed, from the PC 12 to the cloud print service (S102). This is registration of a print job. The print job management server 102 executes registration processing of the print job. The above is the procedure performed in the PC 12.

When the print job is registered, data conversion is performed in the background in the cloud print service. The print job management server 102 requests the data conversion system 100 to perform data conversion of the registered electronic document file (S103). The details of the processing performed in this case will be described later.

When the user performs printing and outputting, the following series of processes are performed in the MFP 13. First, it is confirmed whether the MFP 13 is a device supported by the cloud print service. The confirmation is authentication as a device (S104). Then, the user operates the MFP 13 to log in to the cloud print service from the MFP 13. The log-in is authentication as a user (S105).

After the authentication, the user acquires a job list from the cloud print service and displays the job list on a display of the MFP 13 (S106). Then, a print job desired to be printed and output is selected from the displayed job list (S107). Then, the MFP 13 acquires the print job from the cloud print service and outputs the print job (S108).

As described above, the PC 12 and the MFP 13 may be physically distant from each other, and the PC 12 does not have to preparatorily have a printer driver (that is, a data conversion engine) for the MFP 13, which is effective for, for example, creating and uploading a conference document and printing and outputting the conference document on the site during an overseas business trip.

Data Conversion System

A data conversion system 100 according to the present embodiment has a configuration described below to respond to various data conversion requests and to flexibly respond to an increase in the types and number of data conversion requests. FIG. 4 illustrates a functional configuration of the data conversion system 100.

As illustrated in FIG. 4, the data conversion system 100 includes a front-end application 102a that is a function of the print job management server 102, the shared file storage 107, and the asynchronous conversion server 101 that provides an asynchronous conversion service. The asynchronous conversion server 101 includes a data conversion request management unit 111, a message queue 112, a job information management database 108, and a plurality of converters 120.

The print job management server 102 has a function of receiving a print job transmitted from an input device such as the PC 12 and registering an electronic document file or the like included in the print job in the shared file storage 107 in the solution of cloud print described referring to FIG. 3. Moreover, the print job management server 102 receives an output instruction of a print job from an output device such as the MFP 13, determines file conversion used for execution of the output instruction, and controls the data conversion system 100 to execute the conversion. The converted file is registered in the shared file storage 107. The print job management server 102 transmits the registered and converted file to the MFP 13 to which the output instruction has been transmitted.

The front-end application 102a has a function of determining file conversion used for execution of the output instruction among the functions of the print job management server 102. For example, when the registered electronic file is a Word (registered trademark) document file of Microsoft Corporation and the MFP 13 that has transmitted the output instruction is of a model compliant with the RPCS that is the page description language developed by Ricoh Co., Ltd., the front-end application 102a determines conversion from the data in the data format of the Word document file to the data in the data format of the RPCS.

The front-end application 102a sets the type of the determined data conversion to a parameter such as "type="doc2rpcs"" and embeds the parameter in a request to be transmitted to the asynchronous conversion server 101. Likewise, the front-end application 102a embeds the uniform resource indicator (URI) of data of the conversion source in the request as a parameter. In this case, the URI is information on the location of data in the shared file storage 107.

In the asynchronous conversion server 101 that has received the request including at least the type of data conversion and the URI of the data, the data conversion request management unit 111 first receives the request. The data conversion request management unit 111 analyzes the request related to the data conversion and determines whether there is a converter 120 that matches the type of data conversion. When there is the converter 120, the data conversion request management unit 111 enters a queue in the message queue 112 corresponding to the converter 120. When there is not the converter 120, the data conversion request management unit 111 associates a plurality of converters 120 of different types with each other to determine a combination that allows the desirable type of data conversion to be obtained, and enters a queue in the message queue 112 corresponding to first one of the converters 120.

The data conversion request management unit 111 registers or updates information on the request in the job information management database 108 concurrently with the entry of the queue in the message queue 112. The information registered in the job information management database 108 includes the location of a file (the URI on the shared file storage 107), the type of data conversion included in a request, and the state of the request. The state of the request includes, for example, "data conversion executing", "data conversion relaying", and "data conversion completed", and represents a status indicating the processing state of data conversion.

The message queue 112 includes a queue corresponding to each of the plurality of converters 120. Each converter 120 monitors the queue corresponding to the converter 120, as soon as a message enters the queue, fetches information on a request registered in the job information management database 108 corresponding to the message, and acquires data on the shared file storage 107 based on the URI included in the acquired information on the request. Then, the acquired data is converted.

Each converter 120 registers the converted data on the shared file storage 107, and rewrites and updates the information on the request registered on the job information management database 108. Moreover, when data conversion is performed in association with another converter, after the data conversion by the converter, a new request is entered in the queue of the converter that performs data conversion next.

Figure 5:
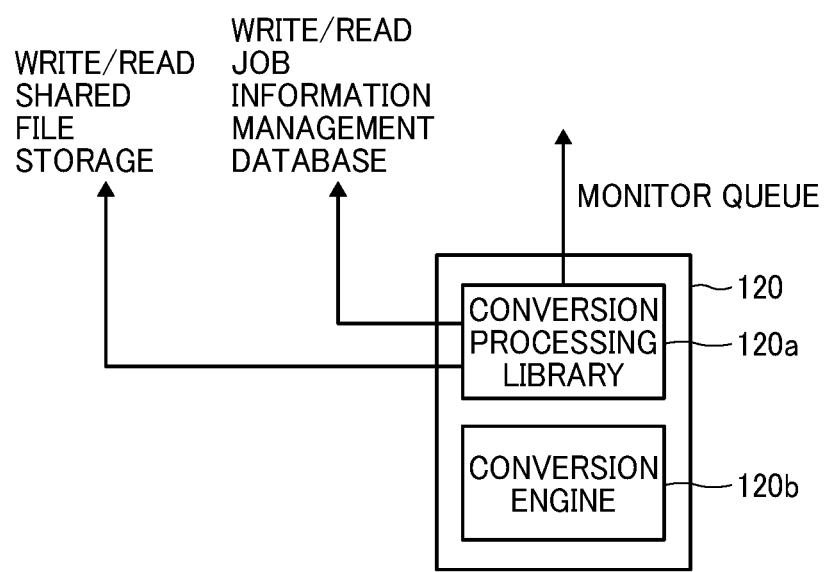
FIG. 5 is a block diagram illustrating an example configuration of a converter in FIG. 4.

The plurality of converters 120 are mutually different converters (a first converter 121, a second converter 122, ..., and an n-th converter 12n) that do not overlap each other. As illustrated in FIG. 5, each converter 120 includes a conversion processing library 120a and a conversion engine 120b.

The conversion processing library 120a executes processing of monitoring the queue corresponding to the converter 120, processing of registering converted data on the shared file storage 107, processing of rewriting and updating information on a request registered on the job information management database 108, and processing of entering a new request in the queue of the converter that performs data conversion next after data conversion in the case of data conversion in an associated manner.

Examples of the conversion engine 120b include office2rpcs that is an engine that converts an electronic document file created using Office software provided by Microsoft Corporation (registered trademark) into a file in the RPCS that is the page description language developed by Ricoh Co., Ltd.; pdf2rpcs that is an engine that converts a file in Portable Document Format (PDF) into a RPCS file; img2pdf that is an engine that converts an image file into a PDF file; and html2pdf that is an engine that converts a page file described in Hypertext Markup Language (HTML) into a PDF file.

Asynchronous Conversion Service

Figure 6:
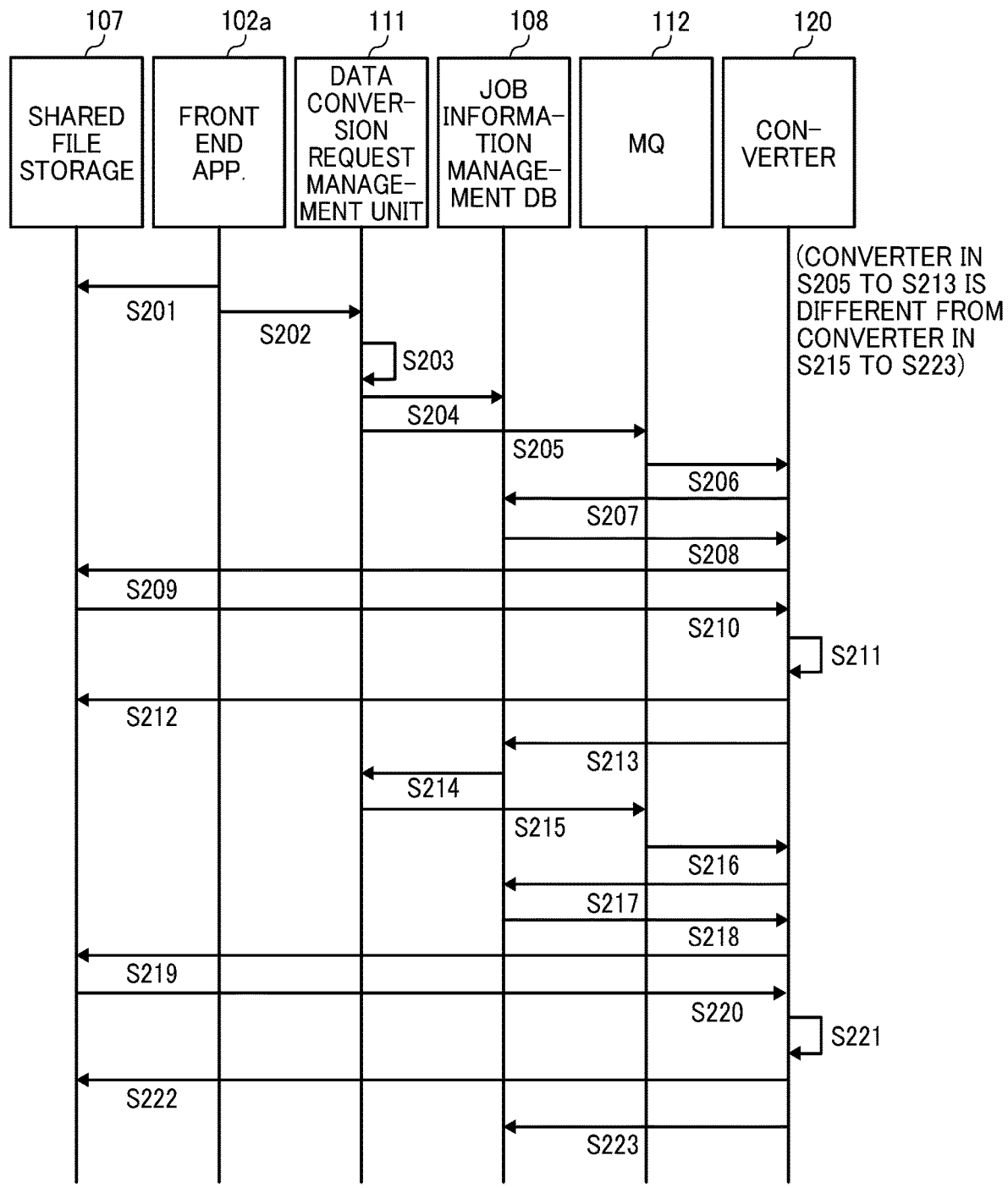
FIG. 6 is a timing chart illustrating example operation of an asynchronous conversion server in FIG. 4.

A flow of an asynchronous conversion service by the asynchronous conversion server 101 illustrated in FIG. 4 is described referring to a timing chart in FIG. 6.

Data is registered in advance in the shared file storage 107 (S201), and the asynchronous conversion service starts when the front-end application 102a transmits a request for data conversion on the data registered in the shared file storage 107 to the data conversion request management unit 111 that constitutes the data conversion system 100 (S202).

In the request transmitted in S202, the type of data conversion determined by the front-end application 102a is embedded using a parameter such as "type='doc2rpcs'". In the request, the URI of data to be converted is also embedded as a parameter.

When receiving the request, the data conversion request management unit 111 analyzes the request related to the data conversion and determines whether there is a converter 120 that matches the type of data conversion (S203). When there is the converter 120, the data conversion request management unit 111 enters a queue in the message queue 112 corresponding to the converter 120. When there is not the converter 120, the data conversion request management unit 111 associates a plurality of converters 120 of different types with each other to determine a combination that allows the desirable type of data conversion to be obtained, and enters a queue in the message queue 112 corresponding to first one of the converters 120.

Figure 7:
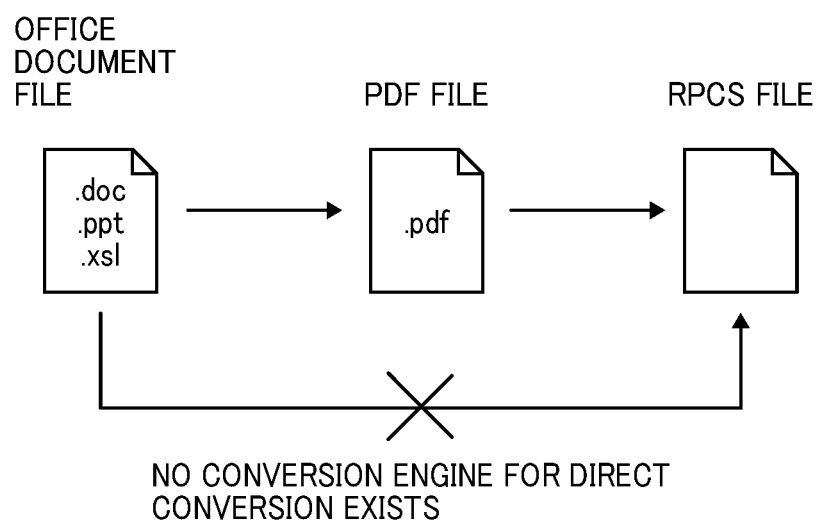
FIG. 7 illustrates example transition of data in FIG. 6.

In the present example dependent on FIG. 6, a case is considered where there is not the converter 120 that matches the type of data conversion and where desirable data conversion is possible when two types of converters 120 are associated with each other. For example, as illustrated in FIG. 7, there is a case where "office2rpcs (an engine that converts an electronic document file created using Office software provided by Microsoft Corporation into a file in the RPCS that is the page description language developed by Ricoh Co., Ltd.)" is not present and where data conversion from the Office document to the file in the printer description language is possible when "office2pdf" and "pdf2rpcs" are associated with each other.

The data conversion request management unit 111 registers information on the request in the job information management database 108 (S204) and concurrently enters a queue in the message queue 112 (S205).

When each converter 120 monitoring the queue detects that a message has entered the queue (S206), the converter 120 fetches the information on the request registered in the job information management database 108 corresponding to the message (S207, S208), and acquires data on the shared file storage 107 based on the URI included in the acquired information on the request (S209, S210). Then, the converter 120 converts the acquired data (S211).

Each converter 120 registers or updates the converted data on the shared file storage 107 (S212) and concurrently updates the information on the request registered in the job information management database 108 to indicate that the data has been converted (S213). At this time, the state of the request is updated to "data conversion relaying".

The data conversion request management unit 111 monitors update of the job information management database 108. When it is detected that the first stage of the processing of the data conversion divided into the two stages in S203 is ended (S214), the data conversion request management unit 111 generates a message of the data conversion in the second stage and enters a queue in the message queue 112 (S215).

Alternatively, each converter 120 may directly enter a queue in the message queue 112. In this case, the converter 120 (or the conversion processing library 120a) executes, after the data conversion in the converter, processing of entering a new request in the queue of the converter that performs data conversion next.

When each converter 120 monitoring the queue detects that a message has entered the queue (S216), the converter 120 fetches the information on the request registered in the job information management database 108 corresponding to the message (S217, S218), and acquires data on the shared file storage 107 based on the URI included in the acquired information on the request (S219, S220). Then, the converter 120 converts the acquired data (S221).

Each converter 120 registers or updates the converted data on the shared file storage 107 (S222) and concurrently updates the information on the request registered in the job information management database 108 to indicate that the data has been converted (S223). At this time, the state of the request is updated to "data conversion completed".

The processing in S215 to S223 is similar to the processing in S205 to S213, except that different converters 120 (for example, the first converter 121 and the second converter 122) perform the data conversion (except for a case where the same data conversion is doubly performed).

By performing the above-described operation, for a request of a conversion request without a conversion engine that directly converts data as illustrated in FIG. 7, instead of preparing a conversion engine and a conversion request to satisfy such a request, a plurality of existing converters are combined and associated with each other to process the conversion request.

The types of requests for data conversion may increase after the data conversion system 100 is started up as described above. According to the present embodiment, it is possible to flexibly respond to the situation.

The types of converters are not limited to those according to the above-described embodiment. Other examples may include a converter that converts data of a barcode image into data of a character string, and a converter that performs OCR (reading characters) from data of an image file to convert the data into data of a character string.

Response to Increase in the Number of Jobs

The data conversion system 100 according to the present embodiment can respond to an increase in the types of data conversion processing and an increase in the number of jobs of the data conversion processing. That is, the data conversion system 100 according to the present embodiment activates a required number of converters 120 when the number of jobs accumulated in the queue becomes equal to or larger than a predetermined threshold value to respond to an increase in the number of jobs.

Server Configuration

Figure 8:
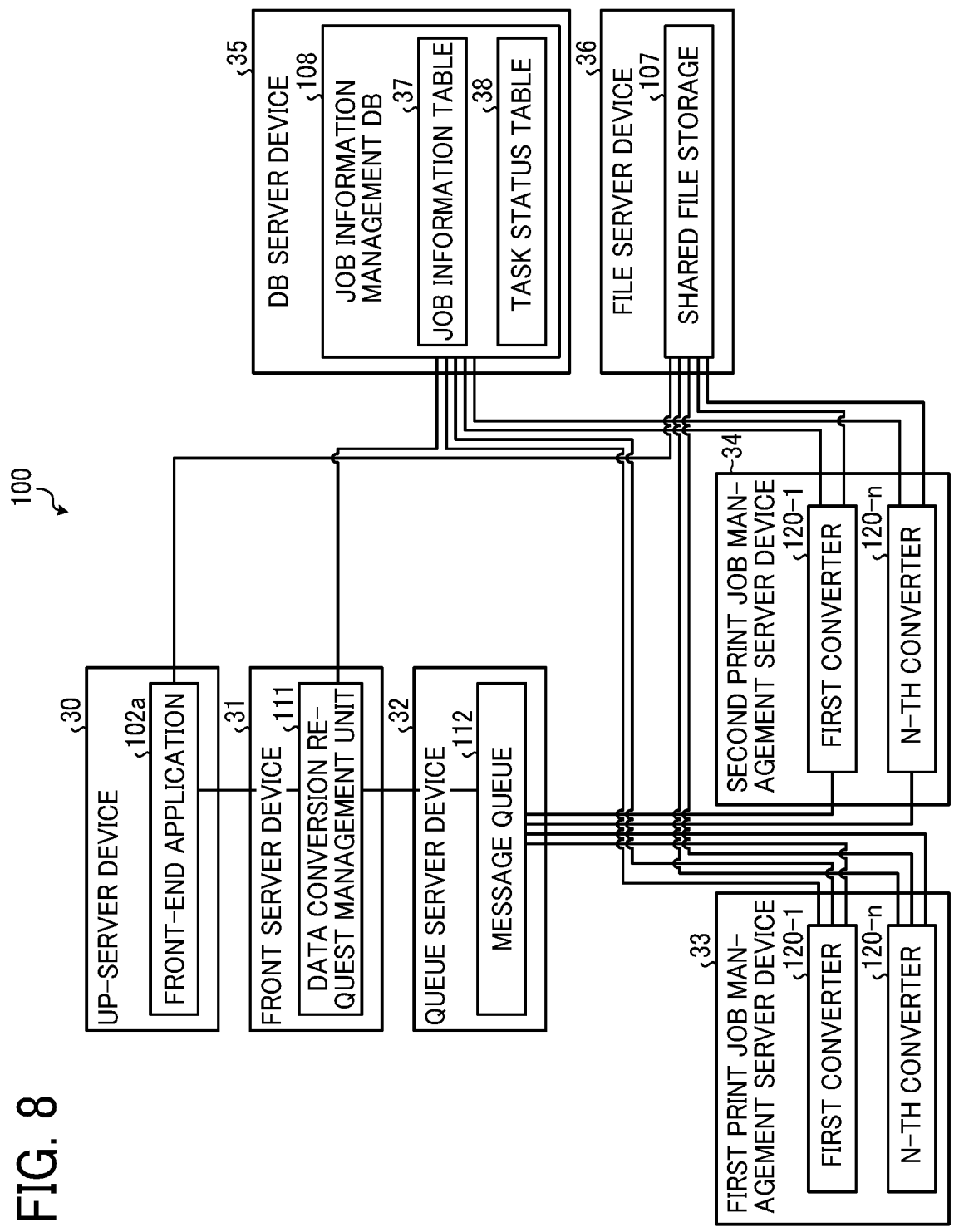
FIG. 8 illustrates a server configuration of a data conversion system according to the embodiment.

Data conversion system 100 according to the present embodiment has a server configuration illustrated in FIG. 8. As illustrated in FIG. 8, the data conversion system 100 according to the present embodiment includes an up-server device 30, a front server device 31, a queue server device 32, a first print job management server device 33, a second print job management server device 34, a database server device (DB server device) 35, and a file server device 36.

The up-server device 30 includes the above-described front-end application 102*a*. The front server device 31 includes the above-described data conversion request management unit 111. The queue server device 32 accumulates a message queue 112. Each of the first print job management server device 33 and the second print job management server device 34 includes a predetermined number of converters 120-1 to 120-*n* (n is a natural number equal to or larger than 2). The DB server device 35 includes the above-described job information management DB 108. The file server device 36 includes the above-described shared file storage 107.

In this example, the two print job management server devices 33 and 34 are provided (redundant configuration); however, one or three or more print job management server devices may be provided. Since the plurality of print job management server devices are provided, even when one server device becomes abnormal, the converter 120 of another server device can continue document processing and so forth. In one example, a plurality of up-server devices 30, a plurality of front server devices 31, a plurality of queue server devices 32, a plurality of DB server devices 35, and a plurality of file server devices 36 may be provided.

Configuration of Job Information Table

The job information management DB 108 of the DB server device 35 includes a job information table 37 and a task status table 38. The job information table 37 has a configuration illustrated in Table 1 below.

server instances, such as a first instance and a second instance. The processing in charge of each instance is divided as illustrated in FIGS. 9 and 10.

There are also two types of queues, "Normal (a queue whose processing time is short)" and "Heavy (a queue whose processing time is long)". The function that takes a time for processing is stored in the Heavy queue to smoothly process the queue for which processing can be performed in a short time.

Not all the converters 120 in the server instance monitor all the queues. For example, as illustrated in FIG. 9, in the converter 120 of the Linux (registered trademark) system, a first conversion process and a second conversion process of the first instance are in charge of foreign language OCR and email transmission. Moreover, a seventh conversion process and an eighth conversion process of the second instance are in charge of foreign language OCR and email transmission.

Figure 9:
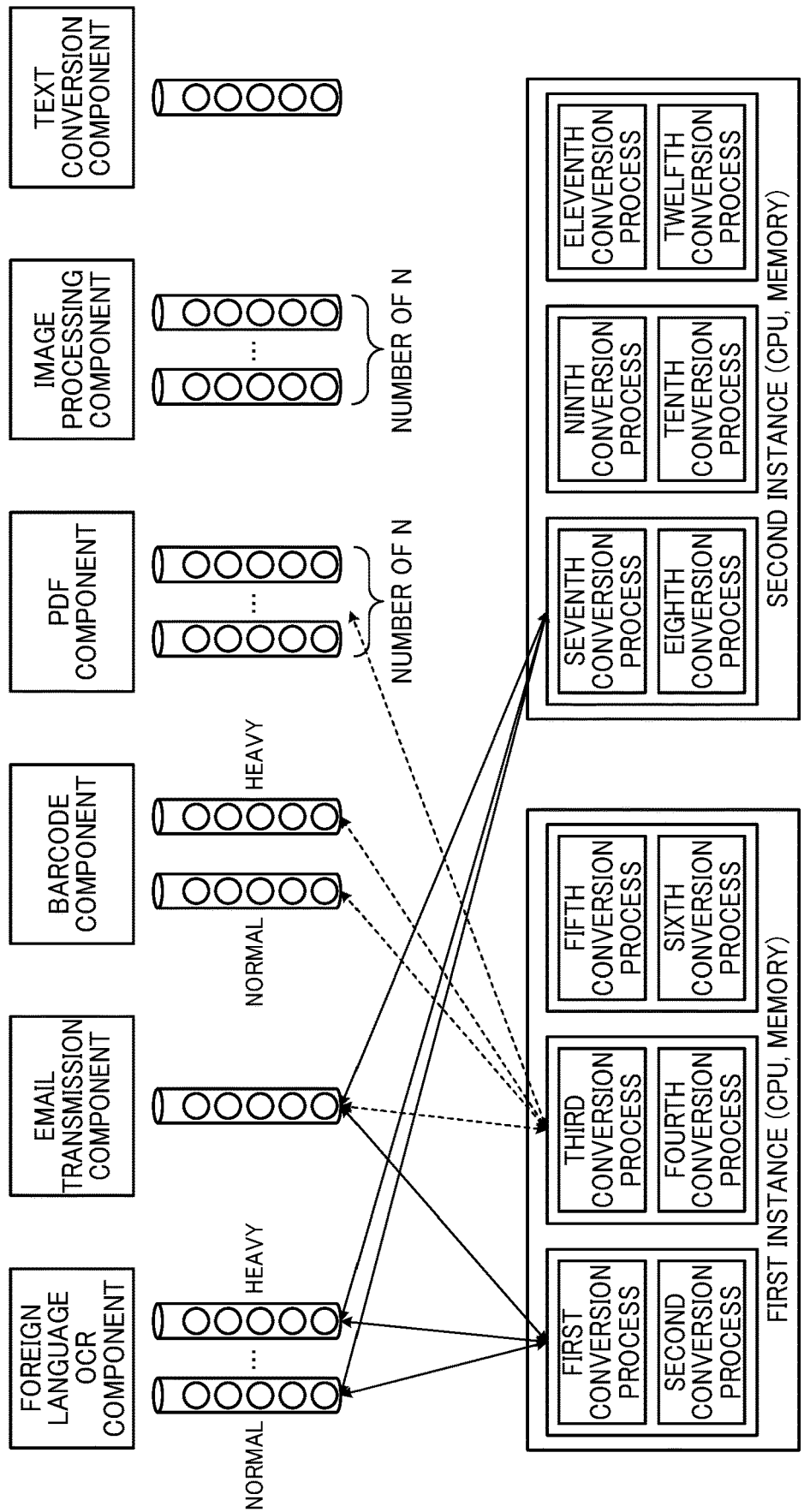
FIG. 9 illustrates a converter of a Linux (registered trademark) system according to the embodiment.
Figure 10:
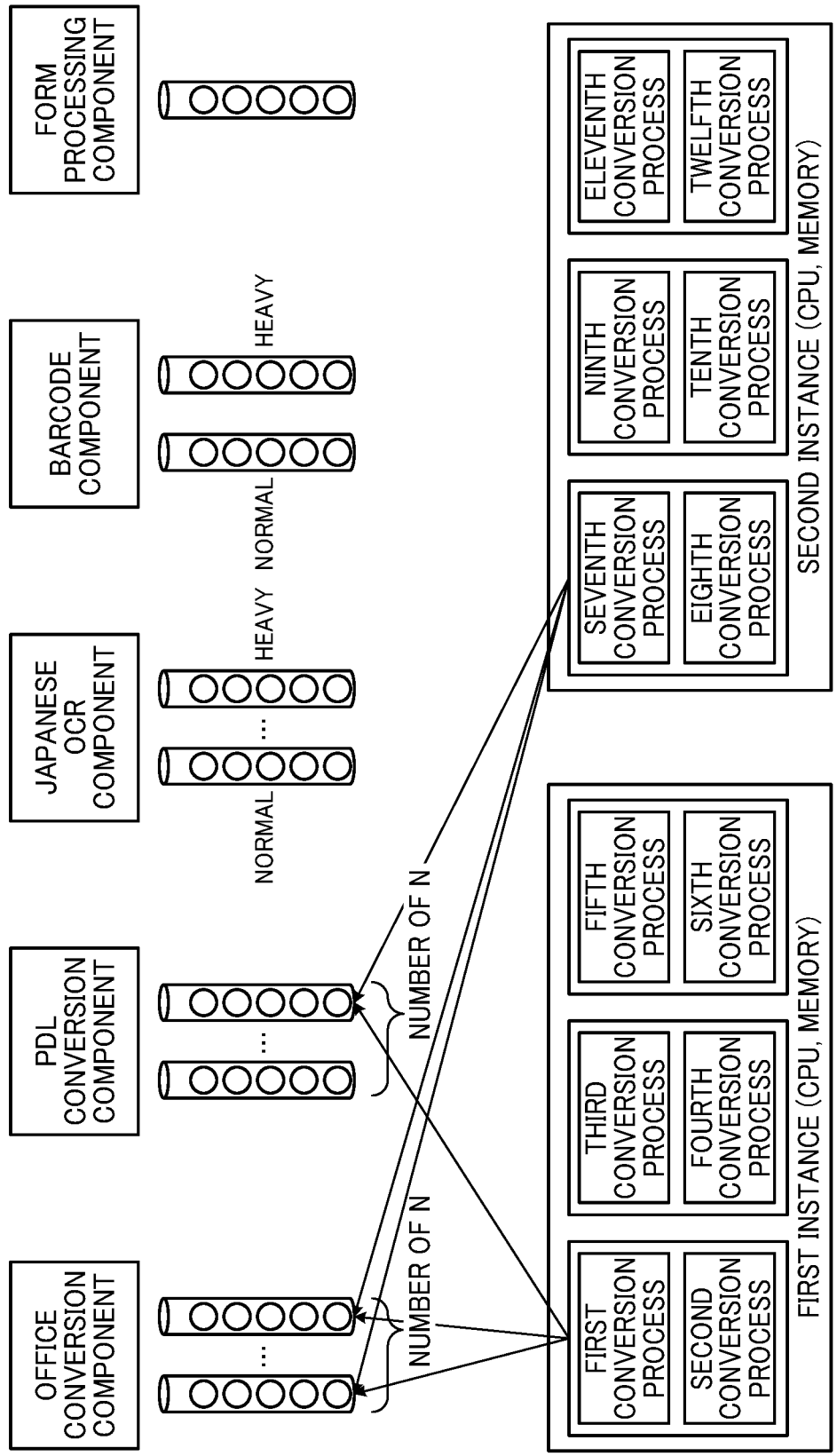
FIG. 10 illustrates a converter of a Windows (registered trademark) system according to the embodiment.

In the converter 120 of the Linux (registered trademark) system illustrated in FIG. 9, a third conversion process and a fourth conversion process of the first instance are in charge of barcode processing, PDF processing, and email transmission. Moreover, a ninth conversion process and a tenth conversion process of the second instance are in charge of barcode processing, PDF processing, and email transmission.

In the converter 120 of the Linux (registered trademark) system illustrated in FIG. 9, a fifth conversion process and a sixth conversion process of the first instance are in charge of image processing, text conversion, and email transmission. An eleventh conversion process and a twelfth conversion process of the second instance are in charge of image processing, text conversion, and email transmission.

TABLE 1

| Job ID | User ID | Status | Entry date and time | Completion date and time | Job type | Parameter | Result |
|---|---|---|---|---|---|---|---|
| 1 | AAA | done | 2018 Nov. 17 17:59 | 2018 Nov. 17 18:03 | office2pdf | param1 | result1 |
| 2 | AAA | error | 2018 Nov. 17 18:02 | 2018 Nov. 17 18:05 | office2pdf | param2 | result2 |
| 3 | BBB | doing | 2018 Nov. 18 1355 | | image2pdf | param3 | |
| 4 | BBB | doing | 2018 Nov. 18 1357 | | image2pdf | param4 | |
| 6 | BBB | accepted | 2018 Nov. 18 1358 | | image2pdf | param5 | |
| 7 | CCC | accepted | 2018 Nov. 18 14:01 | | send_mail | param6 | |
| 8 | DDD | accepted | 2018 Nov. 18 14:02 | | ocr | param7 | |
| 9 | CCC | accepted | 2018 Nov. 18 14:05 | | send_mail | param8 | |

As illustrated in Table 1, recorded in the job information table 37 are a job ID for identifying a job, a user ID for identifying a user of the job, and an entry date and time indicating when the job has been requested. Also recorded in the job information table 37 are a completion date and time indicating when the processing has ended, a job type indicating what the job is, a parameter when the processing is executed, and a result of execution of the processing.

Configuration of Converter

The converter 120 includes, for example, a Linux (registered trademark) system converter 120 illustrated in FIG. 9 and a Windows (registered trademark) system converter 120 illustrated in FIG. 10. The Linux (registered trademark) system and the Windows (registered trademark) system have redundant configurations and each include, for example, two Similarly, as illustrated in FIG. 10, in the converter 120 of the Windows (registered trademark) system, a first conversion process and a second conversion process of the first instance are in charge of Office conversion and PDL conversion. Moreover, a seventh conversion process and an eighth conversion process of the second instance are in charge of Office conversion and PDL conversion.

In the converter 120 of the Windows (registered trademark) system illustrated in FIG. 10, a third conversion process and a fourth conversion process of the first instance are in charge of Japanese OCR processing (Normal and Heavy). Moreover, a ninth conversion process and a tenth conversion process of the second instance are in charge of Japanese OCR processing (Normal and Heavy).

In the converter 120 of the Windows (registered trademark) system illustrated in FIG. 10, a fifth conversion process and a sixth conversion process of the first instance are in charge of barcode processing (Normal and Heavy) and form processing. Moreover, an eleventh conversion process and a twelfth conversion process of the second instance are in charge of barcode processing (Normal and Heavy) and form processing.

The type of queue in charge of the processing as described above and the converter 120 in charge of the processing of the queue are set in advance. Such setting of the processing in charge does not change while the data conversion system 100 is operating.

Inconvenience Due to Increase in the Number of Queues

Figure 11:
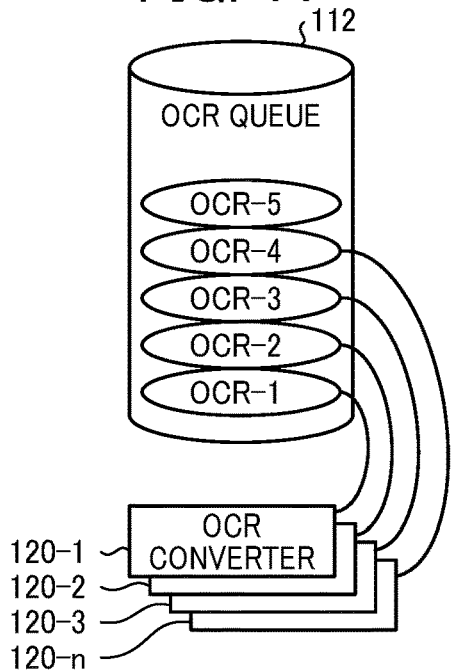
FIG. 11 illustrates queues of optical character recognition (OCR) processing of a message queue and converters that perform the OCR processing according to the embodiment.

FIG. 11 illustrates, for example, OCR queues of the message queue 112 and converters (OCR converters 120-1 to 120-n) that perform the OCR processing. As described above, the OCR processing is set in advance to be performed in the four conversion processes in total including the first, second, seventh, and eighth conversion processes of the Linux (registered trademark) system. Thus, processing of four OCR queues (OCR-1 to OCR-4) of the message queue 112 can be started immediately. However, since the four conversion processes are all executing the processing, the OCR queue OCR-5 waits for the processing. When the processing in the four conversion processes are prolonged and when a predetermined time elapses, the OCR queue OCR-5 is not processed and is returned as a time-out error.

Automatic Increase Configuration of Converter

The data conversion system 100 according to the present embodiment has a configuration in which the number of converters 120 is automatically increased to prevent occurrence of a queue whose processing becomes a standby state and a queue whose processing becomes a time-out state due to an increase in the number of users in the future.

Figure 12:
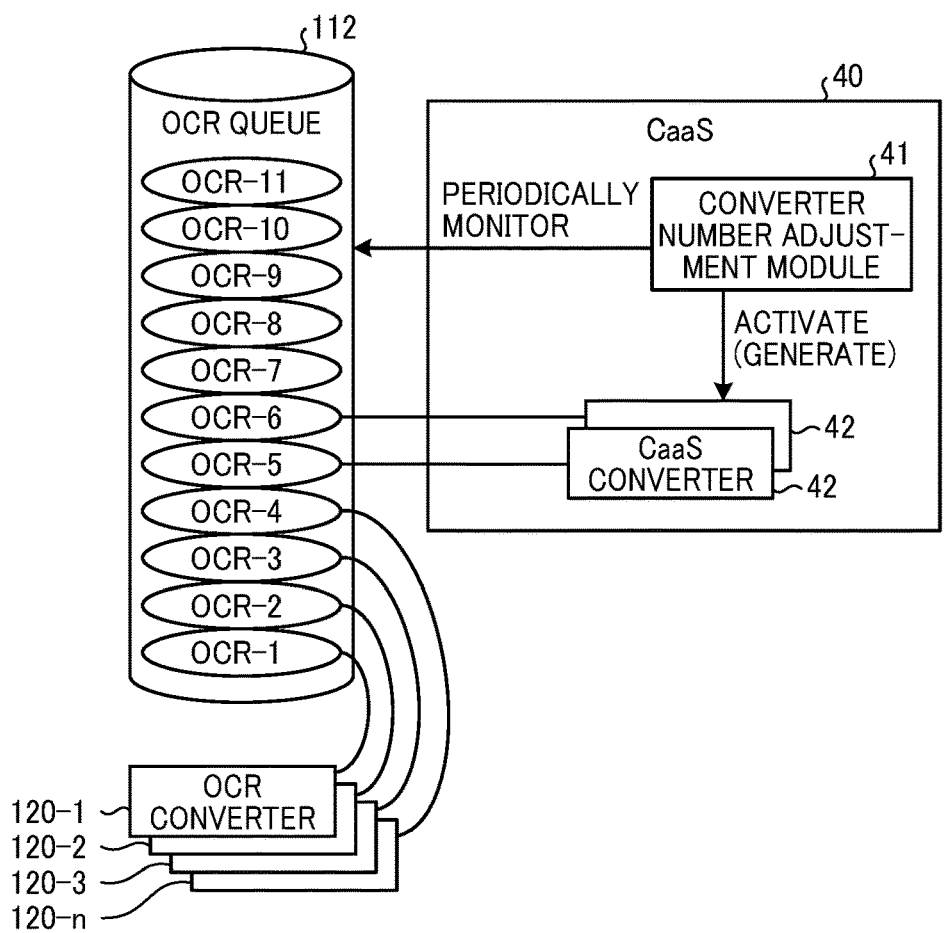
FIG. 12 illustrates a configuration of a container of the data conversion system according to the embodiment.

That is, as illustrated in FIG. 12, the data conversion system 100 according to the present embodiment includes a converter number adjustment module 41 at a container 40 of so-called Containers as a Service (CaaS). The container 40 is provided with a CaaS converter 42 of a Docker (registered trademark) image. The converter number adjustment module 41 activates a Docker image as a task when required to form one or more CaaS converters 42 (an example of a virtual converter) (container virtualization by Docker).

The container 40 is a user space virtually provided on an operating system (OS). The user space is a space in which a set of resources for a user to execute an application are provided.

For example, it is assumed that processing of four OCR queues (OCR-1 to OCR-4) is started by, for example, four existing OCR converters 120-1 to 120-n, but eleven OCR queues are accumulated in the queue server device 32. The converter number adjustment module 41 periodically recognizes the number of OCR queues accumulated in the queue server device 32, and determines whether the number of OCR queues is equal to or larger than a predetermined threshold value such as five. When the number of OCR queues is equal to or larger than the predetermined threshold value, the converter number adjustment module 41 activates the CaaS converter 42 that is a converter that performs processing of OCR queues, in addition to the existing OCR converters 120-1 to 120-n. The CaaS converter 42 executes the processing of the OCR queues.

The CaaS converter 42 is configured using, for example, a technology called a Docker container provided in Amazon Web Service (AWS, registered trademark) and has the following characteristics.

1. An existing converter 120 normally exists, polls the queue server device 32 at a predetermined time interval, and processes a queue when the queue is present in the queue server device 32. In contrast, when the CaaS converter 42 is activated, for example, the CaaS converter 42 looks at the queue server device 32 once, and when a queue to be processed is present in the queue server device 32, the CaaS converter 42 processes the job of the queue. The CaaS converter 42 stops the processing and disappears when the processing of the job is completed.

2. To form a server device of the existing converter 120, various pieces of software in addition to the operating system have to be installed and deployed. In other words, a work of providing a converter 120 is required for the server device having no converter 120. Thus, the addition of a converter 120 to the existing converter 120 takes, for example, 15 minutes to 30 minutes. In contrast, in the case of the CaaS converter 42, since the CaaS converter 42 is also imaged and can be implemented in a container that can be started up in a short time, a converter 120 can be added in, for example, two to three minutes. Thus, a converter 120 can be added more efficiently than in the case where a server device of a converter 120 is added in addition to the existing converter 120.

3. When it is difficult to process a queue using the existing converter 120, the number of CaaS converters 42 is dynamically increased to process the queue that is difficult to be processed, thereby efficiently processing the queue and reducing an inconvenience that the waiting time for the processing of the queue increases or a time-out error occurs.

The Number of Activated CaaS Converters

The converter number adjustment module 41 activates a predetermined number of CaaS converters 42 corresponding to the number of queues exceeding the above-described threshold value. The queue threshold value and the number of CaaS converters 42 to be activated are stored as one of activation conditions in a setting file illustrated in Table 2 below.

TABLE 2

| Function (queue) | Queue threshold value | Number of CaaS converters to be activated |
|---|---|---|
| OCR | 5 | 5 |
| Barcode | 11 | 3 |
| ... | | |
| PDF | 15 | 1 |

Although an example is provided, as illustrated in Table 2, for example, for processing that takes a time and uses many resources, such as the OCR processing, a small queue threshold value and a large number of CaaS converters 42 to be activated are set. In contrast, for processing that is completed in a short time and does not use a resource, such as PDF conversion processing, a large queue threshold value and a small number of CaaS converters 42 to be activated are set.

The converter number adjustment module 41 reads the setting file first, and activates the number of CaaS converters 42 corresponding to the queue threshold value described in the setting file. For example, in the case of the OCR queue, the queue threshold value is "5", and the number of CaaS converters 42 to be activated is "5". Thus, the converter number adjustment module 41 activates the five CaaS converters 42 when five or more OCR queues are accumulated in the queue server device 32.

Activation Operation of CaaS Converter

Figure 13:
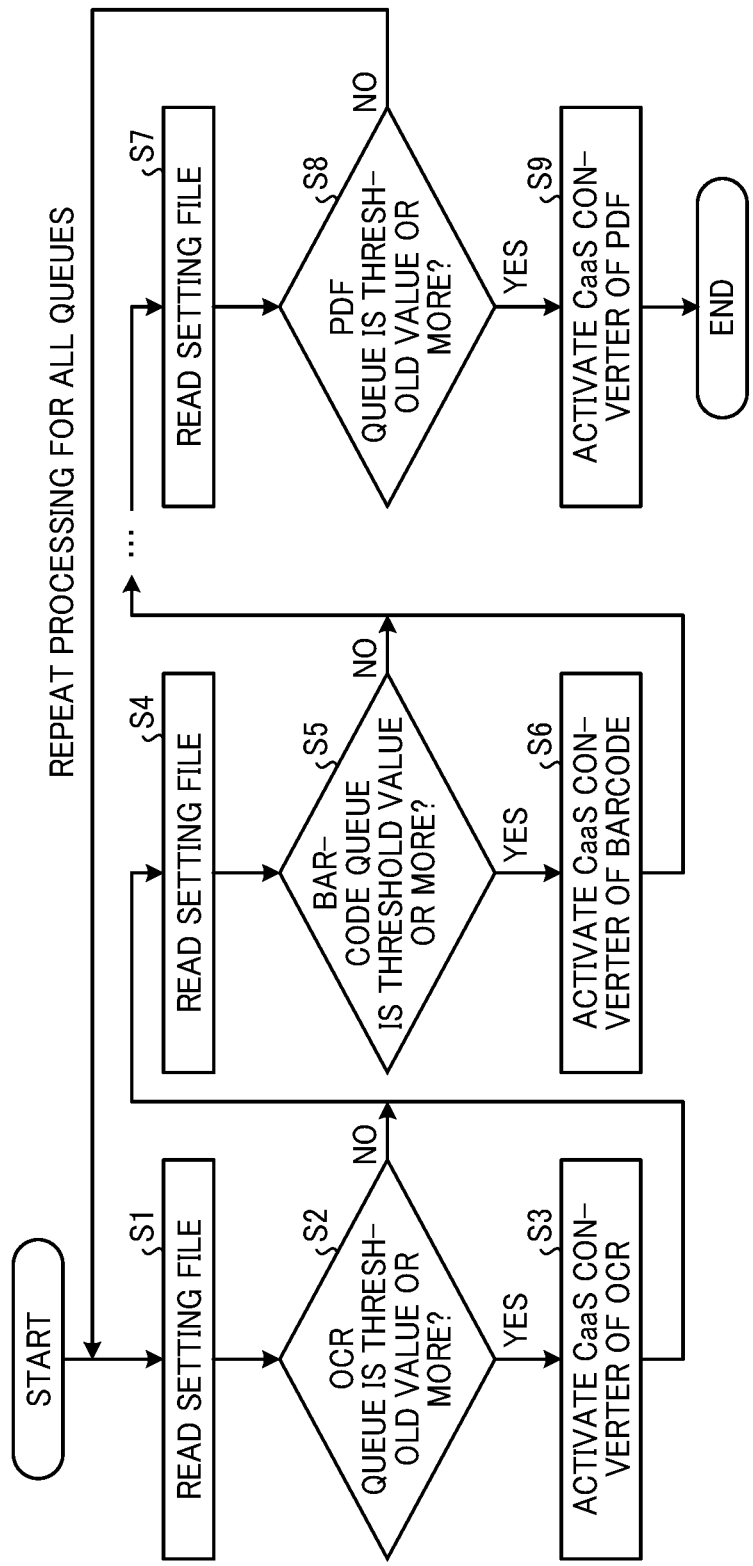
FIG. 13 is a flowchart illustrating a flow of an activation operation of a Containers as a Service (CaaS) converter by a converter number adjustment module provided at the container according to the embodiment.

FIG. 13 is a flowchart illustrating a flow of the activation operation of the CaaS converter 42 by the converter number adjustment module 41. As illustrated in FIG. 13, the converter number adjustment module 41 recognizes the queue threshold value for the OCR processing and the number of CaaS converters 42 to be activated described in the setting file illustrated in Table 2 (step S1).

Then, the converter number adjustment module 41 determines whether a number of OCR queues equal to or larger than the threshold value described in the setting file are accumulated in the queue server device 32 (step S2).

When a number of OCR queues equal to or larger than the threshold value described in the setting file are accumulated in the queue server device 32 (step S2: Yes), the converter number adjustment module 41 activates the number of CaaS converters 42 described in the setting file (step S3). In the case of the example in Table 2, five CaaS converters 42 are activated. Accordingly, the activated CaaS converters 42 process the OCR queues whose processing has stagnated.

In contrast, when a number of OCR queues equal to or larger than the threshold value described in the setting file are not accumulated in the queue server device 32 (step S2: No), the converter number adjustment module 41 recognizes the queue threshold value for the barcode processing and the number of CaaS converters 42 to be activated described in the setting file illustrated in Table 2 (step S4).

Then, the converter number adjustment module 41 determines whether a number of barcode queues equal to or larger than the threshold value described in the setting file are accumulated in the queue server device 32 (step S5).

When a number of barcode queues equal to or larger than the threshold value described in the setting file are accumulated in the queue server device 32 (step S5: Yes), the converter number adjustment module 41 activates the number of CaaS converters 42 described in the setting file (step S6). In the case of the example in Table 2, three CaaS converters 42 are activated. Accordingly, the activated CaaS converters 42 process the barcode queues whose processing has stagnated.

In contrast, when a number of barcode queues equal to or larger than the threshold value described in the setting file are not accumulated in the queue server device 32 (step S5: No), the converter number adjustment module 41 recognizes the queue threshold value for the PDF conversion processing and the number of CaaS converters 42 to be activated described in the setting file illustrated in Table 2 (step S7).

Then, the converter number adjustment module 41 determines whether a number of PDF queues equal to or larger than the threshold value described in the setting file are accumulated in the queue server device 32 (step S8).

When a number of PDF queues equal to or larger than the threshold value described in the setting file are accumulated in the queue server device 32 (step S8: Yes), the converter number adjustment module 41 activates the number of CaaS converters 42 described in the setting file (step S9). In the case of the example in Table 2, one CaaS converter 42 is activated. Accordingly, the activated CaaS converter 42 processes the PDF queue whose processing has stagnated.

In contrast, when a number of PDF queues equal to or larger than the threshold value described in the setting file are not accumulated in the queue server device 32 (step S8: No), the converter number adjustment module 41 returns the processing to step S1, and repeatedly performs each of the above-described processing.

As described above, the converter number adjustment module 41 sequentially detects the number of queues accumulated in the queue server device 32 for each processing of the OCR processing, the barcode processing, and the PDF conversion processing, and activates a preset number of CaaS converters 42 when a number of queues equal to or larger than the threshold value are accumulated in the queue server device 32. Thus, the processing of the stagnating queues can be sequentially performed, and the stagnation of the processing can be addressed.

Rewrite Processing for Setting File

Next, a method of setting the queue threshold value and the number of CaaS converters 42 to be activated illustrated in Table 2 will be described.

The weight of processing and the degree of use of resources are checked based on the past record, and, for example, the queue threshold value and the number of CaaS converters 42 to be activated are described in a setting file as activation conditions in advance. Then, the converter number adjustment module 41 may activate the number of CaaS converters 42 indicated by the setting file.

In this case, for example, it is assumed that 100 OCR queues are suddenly entered. However, the number of CaaS converters 42 to be activated is limited to the number of CaaS converters to be activated described in the setting file. Thus, it is difficult to activate the number of CaaS converters 42 large enough to process the 100 OCR queues, the period of waiting for processing of the queues increases, and a time-out error occurs.

Thus, the data conversion system 100 according to the present embodiment automatically changes the queue threshold value which is one of the activation conditions and the number of CaaS converters 42 to be activated, and can activate the number of CaaS converters 42 corresponding to the number of entered or accumulated queues (rewrite processing for setting file).

Figure 14:
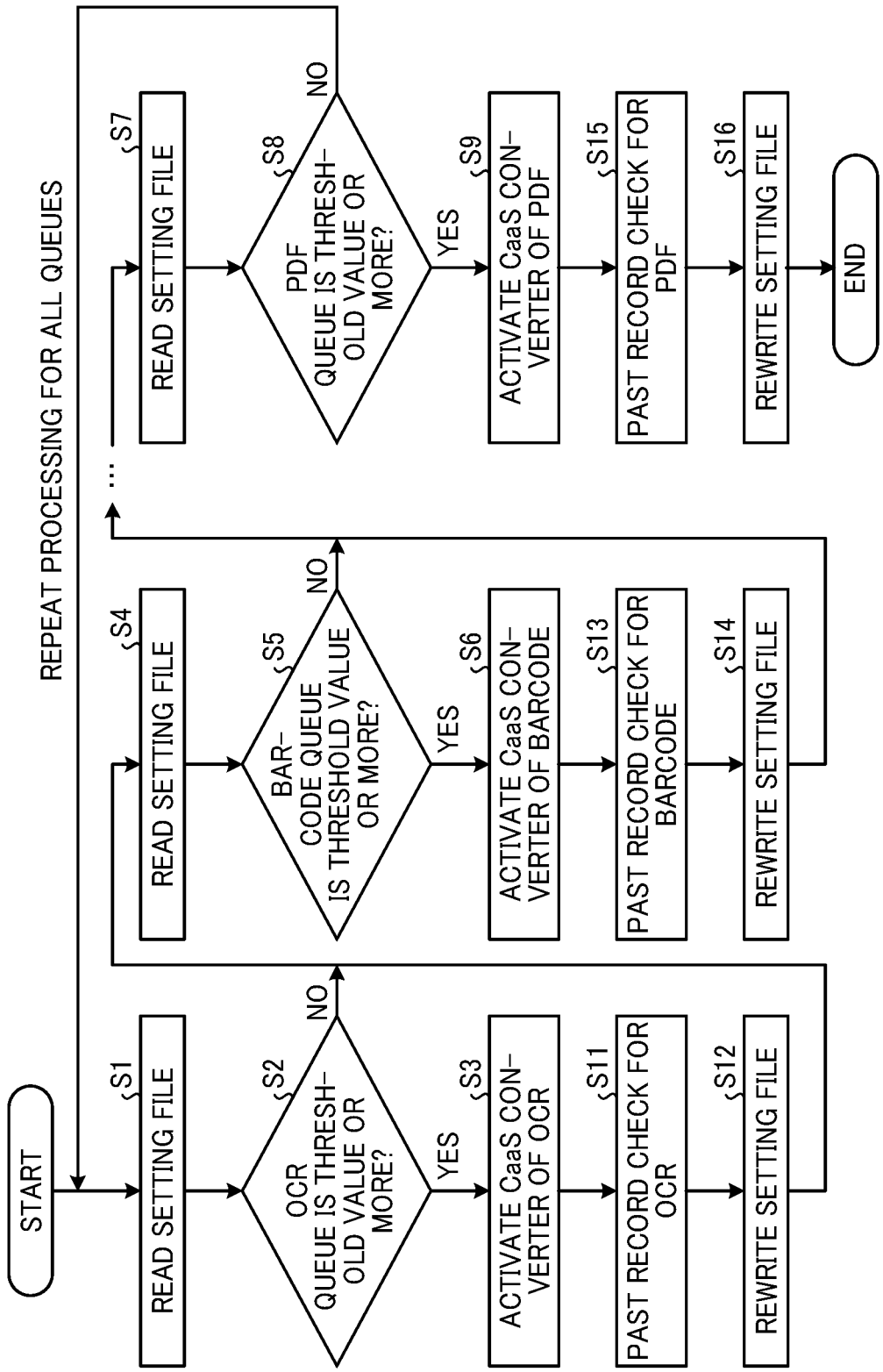
FIG. 14 is a flowchart illustrating rewrite processing for a setting file in the converter number adjustment module provided in the data conversion system according to the embodiment.

FIG. 14 is a flowchart illustrating a flow of an activation operation of the CaaS converter 42 including the rewrite processing for the setting file. The processing from step S1 to step S9 in the flowchart in FIG. 14 is the same as the processing from step S1 to step S9 in the flowchart in FIG. 13. In the flowchart in FIG. 14, in step S3, when the CaaS converter 42 is activated because the number of OCR queues equal to or larger than the threshold value are accumulated in the queue server device 32, the processing proceeds to step S11.

In step S11, the converter number adjustment module 41 performs past record check for the OCR processing. A specific operation of the record check will be described later with reference to a flowchart in FIG. 16. Then, the converter number adjustment module 41 performs rewrite processing of rewriting the queue threshold value for the OCR processing and the number of CaaS converters 42 to be activated in the setting file illustrated in Table 2 based on the result of the past record check for the OCR processing (step S12: rewrite processing for activation conditions).

Then, the converter number adjustment module 41, based on the result of the past record check for the barcode processing (step S13), performs rewrite processing of rewriting the queue threshold value for the barcode processing and the number of CaaS converters 42 to be activated in the setting file illustrated in Table 2 (step S14). Furthermore, the converter number adjustment module 41, based on the result of the past record check for the PDF conversion processing (step S15), performs rewrite processing of rewriting the queue threshold value for the PDF conversion processing and the number of CaaS converters 42 to be activated in the setting file illustrated in Table 2 (step S16).

As described above, the converter number adjustment module 41 sequentially performs the past record check for each processing, and performs the rewrite processing of rewriting the queue threshold value and the number of CaaS converters 42 to be activated in the setting file to values corresponding to the past record check. Accordingly, the number of CaaS converters 42 corresponding to the number of entered or accumulated queues can be dynamically activated, thereby preventing an inconvenience that the time required for waiting for processing of a queue increases and an inconvenience that a time-out error occurs.

Another Example of Rewrite Processing for Setting File

Figure 15:
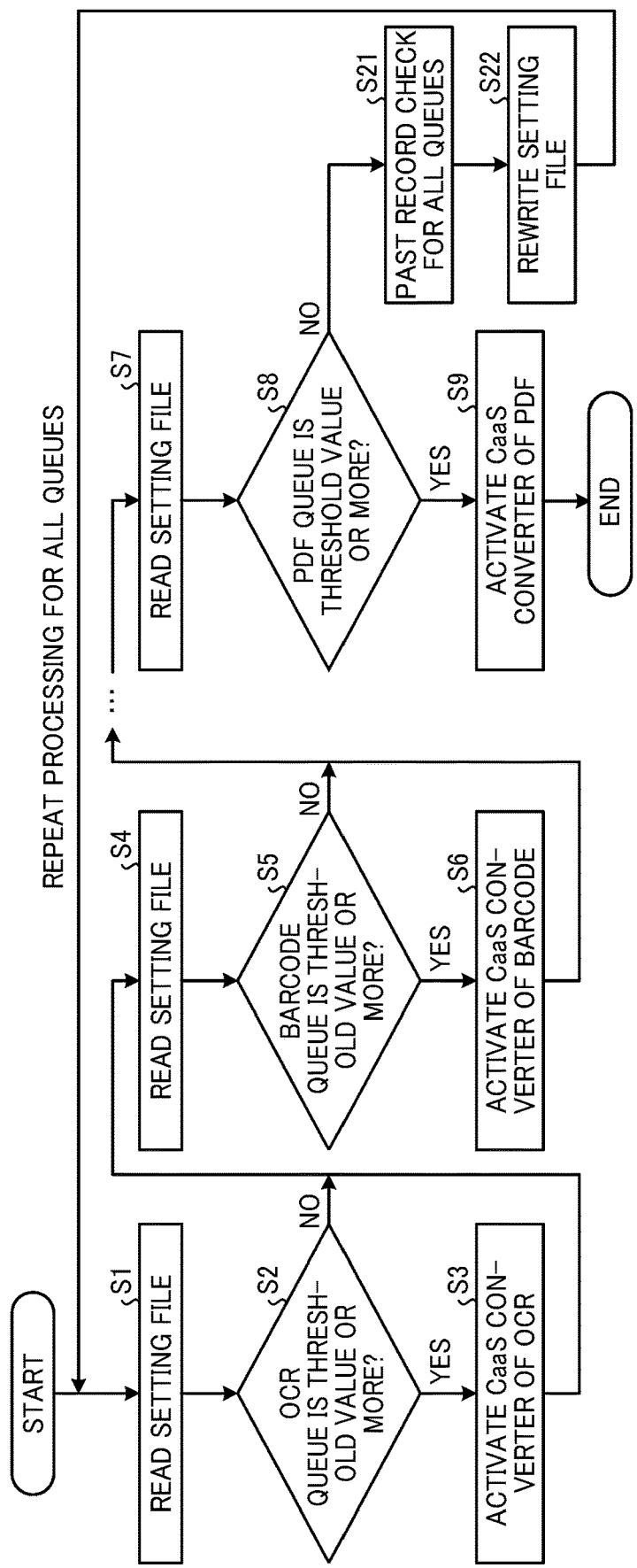
FIG. 15 is a flowchart illustrating another example of the rewrite processing for the setting file in the converter number adjustment module in the data conversion system according to the embodiment.

The rewrite processing for the setting file may be sequentially performed for each processing such as the OCR processing or the barcode processing as described with reference to the flowchart in FIG. 14; however, the rewrite processing may be collectively performed as illustrated in the flowchart in FIG. 15. In this case, as illustrated in the flowchart in FIG. 15, when the processing from step S1 to step S9 is ended, the converter number adjustment module 41 proceeds to step S21. In step S21, the converter number adjustment module 41 collectively performs the past record check for each processing such as the OCR processing and the barcode processing. Then, the converter number adjustment module 41 performs the rewrite processing of rewriting the queue threshold value and the number of CaaS converters 42 to be activated of each processing based on the record check result of each processing (step S22).

Thus, as in the above-described case, the number of CaaS converters 42 corresponding to the number of entered or accumulated queues can be dynamically activated, thereby preventing an inconvenience that the time required for waiting for processing of a queue increases and an inconvenience that a time-out error occurs.

Past Record Check

Figure 16:
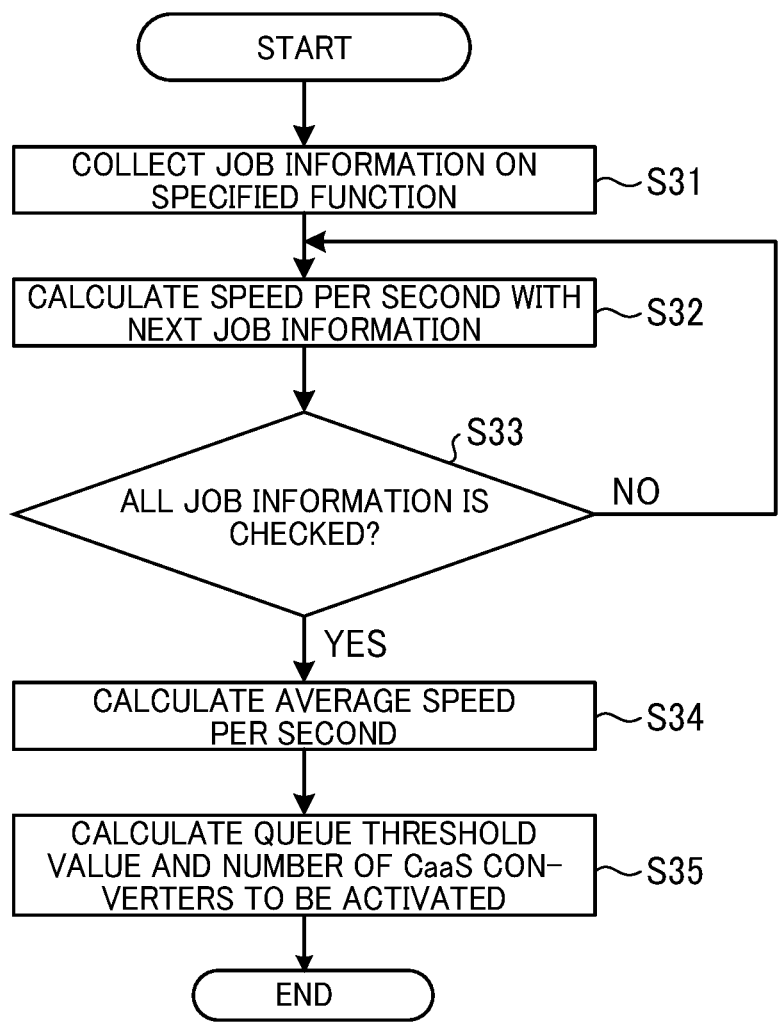
FIG. 16 is a flowchart illustrating a flow of an operation of past record check according to the embodiment.

The past record check is described. The past record check corresponds to the processing of step S11, step S13, and step S15 in the flowchart in FIG. 14, and the processing of step S21 in the flowchart in FIG. 15. FIG. 16 is a flowchart illustrating a flow of an operation of the past record check.

In step S31, the converter number adjustment module 41 collects job information on each of such as the OCR processing and the barcode processing. More particularly, the job information table 37 in the job information management DB 108 illustrated in FIG. 8 stores various types of information such as the job type, the entry date and time, the completion date and time, and the "result" as illustrated in Table 1. The converter number adjustment module 41 acquires, for example, all information related to the OCR processing from the job information table 37. Alternatively, the period such as the past one month may be designated by designating the entry date and time to acquire information.

As illustrated in Table 3 below, the item "result" acquired from the job information table 37 stores various types of information on the total file size, the number of files, and the total number of pages.

TABLE 3

| Total file size | Number of files | Total number of pages |
|---|---|---|
| 10,245,327 | 3 | 37 |

The converter number adjustment module 41 calculates an average speed per second indicating a processing capacity for each processing such as the OCR processing based on the various types of information on the total file size, the number of files, and the total number of pages illustrated in Table 3. That is, the converter number adjustment module 41 performs the following calculation and averages the results for all jobs.

File size per second=total file size/(completion date and time−entry date and time)(second)

Number of files per second=number of files/ (completion date and time−entry date and time) (second)

Number of pages per second=total number of pages/ (completion date and time−entry date and time) (second)

The converter number adjustment module 41 rewrites the setting file to decrease the queue threshold value and increase the number of CaaS converters 42 to be activated when each speed per second calculated in this way exceeds a certain value.

Specifically describing using an example, the converter number adjustment module 41 performs the following calculation, for example, in the case of the file size per second.

Queue threshold value=(file size second/1 MB)

Number of CaaS converters 42 to be activated=5− (file size second/1 MB)

For example, when the file size per second is 5 MB/second, the processing capacity is high, and hence the converter number adjustment module 41 sets the queue threshold value to "5" and the number of CaaS converters 42 to be activated to "1". When the file size per second is 0.1 MB/second, the processing capacity is low, and hence the converter number adjustment module 41 sets the queue threshold value to "1" and the number of CaaS converters 42 to be activated to "10".

The converter number adjustment module 41 calculates the value by rounding up to the decimal point, and determines the value as "1" when the value is smaller than "1". The above-described "1 MB" and the numerical value of "5" which is the initial value of the number of CaaS converters 42 to be activated are merely examples, and any numerical value may be set based on the above-described past record or the like.

The converter number adjustment module 41 calculates the number of files per second based on the following numerical expression.

Queue threshold value=(number of files second/1)

Number of CaaS converters 42 to be activated=5− (number of files second/1)

The converter number adjustment module 41 calculates the number of pages per second based on the following numerical expression.

Queue threshold value=(number of pages second/ 100)

Number of CaaS converters 42 to be activated=5− (number of pages second/100)

The converter number adjustment module 41 writes the queue threshold value and the number of CaaS converters 42 to be activated calculated in this way in the item of the corresponding processing such as the OCR processing of the setting file. Thus, the converter number adjustment module 41 can be operated based on the new setting value from the next time.

The above description is an example in which the file size per second and the number of files per second are checked (calculated) for each processing such as the OCR processing or the barcode processing, and the setting value of the setting file is updated for each processing as described above with reference to FIG. 14. In contrast, in the case of the example illustrated in FIG. 15, the converter number adjustment module 41 collectively checks (calculates) the file size per second and the number of files per second of all processing such as the OCR processing and the barcode processing, and collectively performs update processing on the setting values of all processing of the setting file in step S21.

Figure 17:
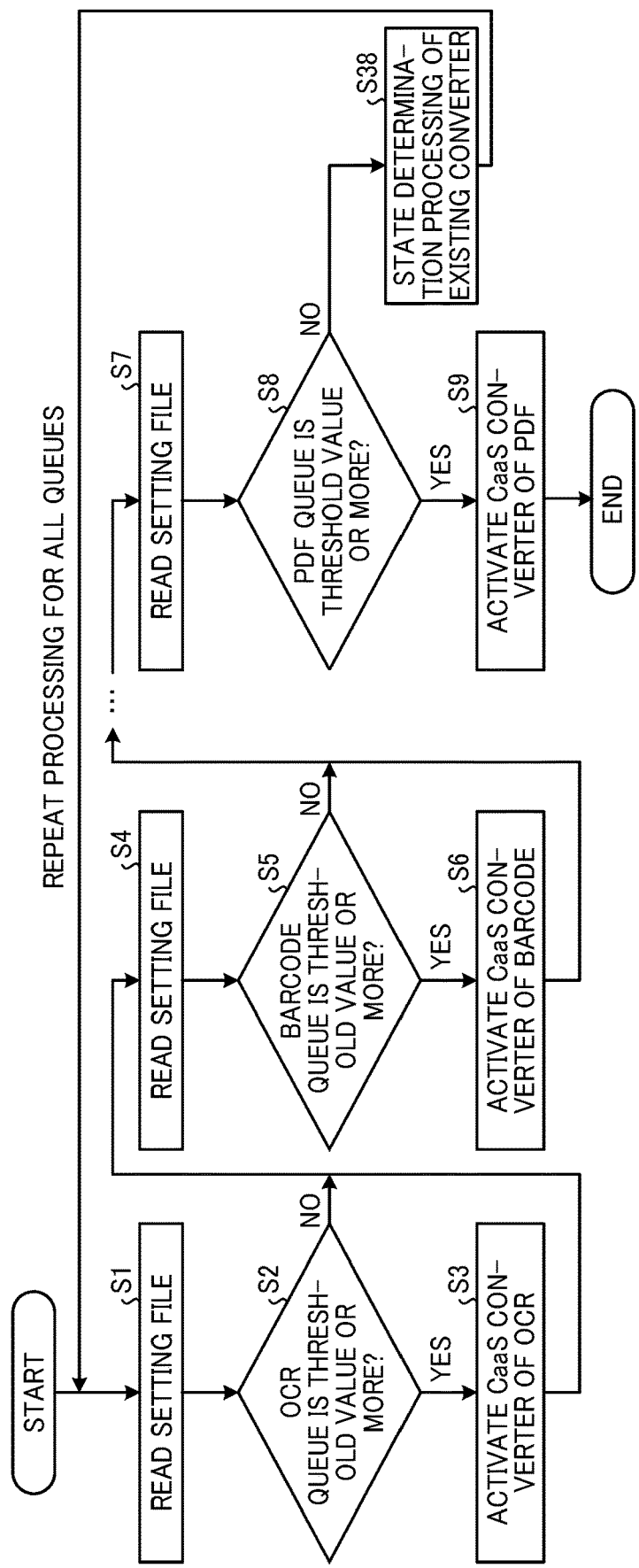
FIG. 17 is a flowchart illustrating processing of determining the state of an existing converter in the converter number adjustment module according to the embodiment.

Activation Processing of CaaS Converter Based on State Determination of Existing Converter As illustrated in step S38 in FIG. 17, the converter number adjustment module 41 may determine the state of the existing converter 120, and activate the CaaS converter 42 based on the determination result of the state. In one example, the determination processing of the state of the existing converter 120 may be performed in combination with the above-described record check.

Figure 18:
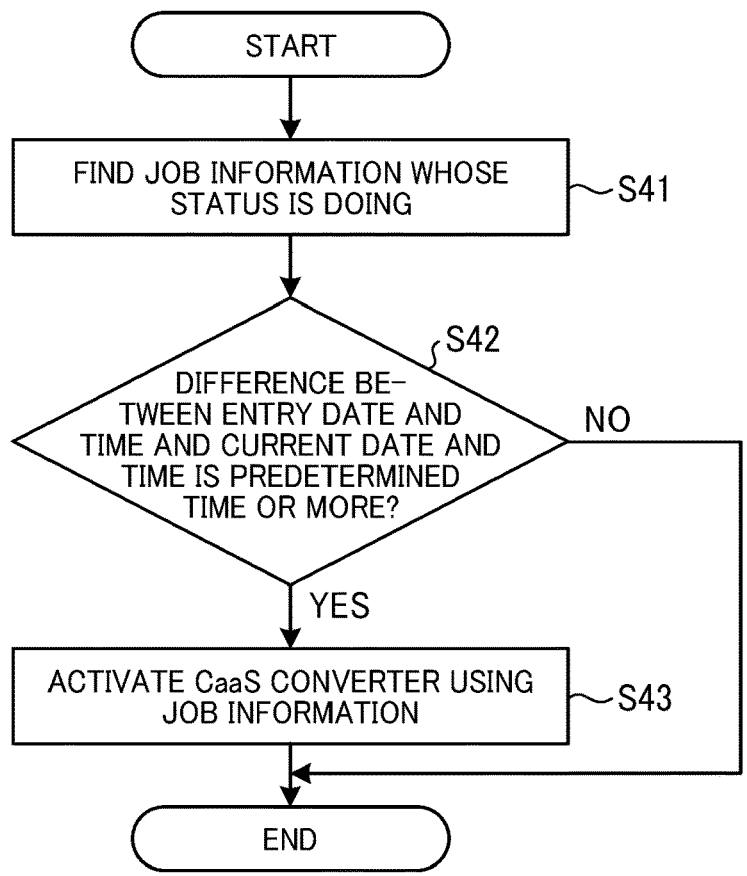
FIG. 18 is a flowchart illustrating in detail processing of determining the state of the existing converter in the converter number adjustment module according to the embodiment.

FIG. 18 is a flowchart illustrating a specific operation in step S38. As illustrated in the flowchart in FIG. 18, the converter number adjustment module 41 first refers to the job information table 37 illustrated in FIG. 8 and detects job information whose status is "data conversion executing (doing)" (step S41). The converter number adjustment module 41 determines whether the entry date and time of the detected job in the state of "data conversion executing (doing)" has passed a predetermined time or more from the current date and time (step S42). When the entry date and time of the job in the state of "data conversion executing (doing)" has passed the predetermined time or more from the current date and time (step S42: Yes), the converter number adjustment module 41 activates the CaaS converter 42 of the processing corresponding to the job and re-executes the stagnating job (step S43).

Thus, the CaaS converter 42 can process the job that has not been processed by the existing converter 120 and for which a certain period of time has passed from the entry.

Re-Execution Operation of Job Whose Status is Error

Figure 19:
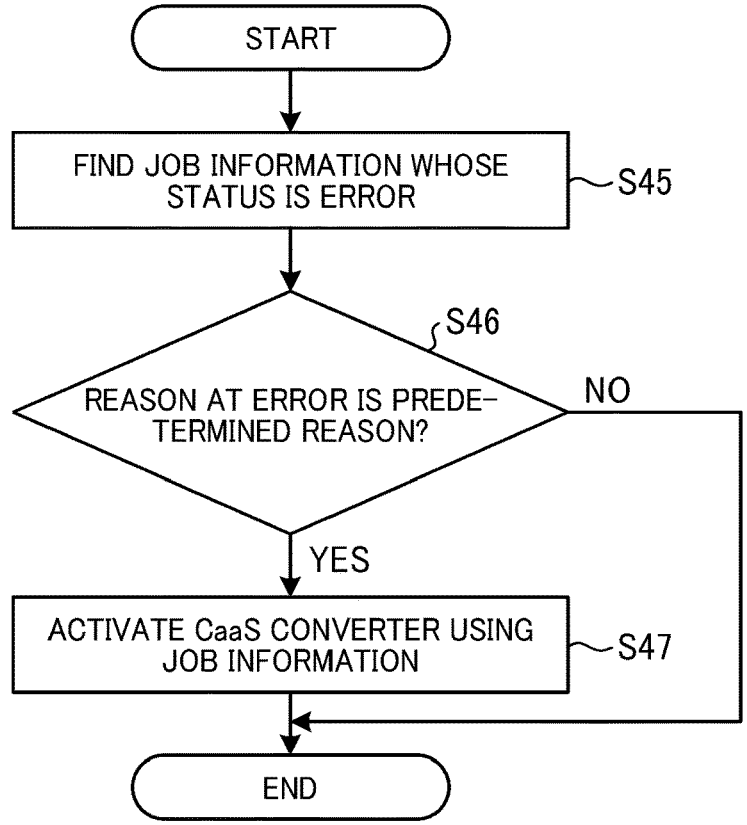
FIG. 19 is a flowchart illustrating a re-execution operation of a job whose status is an error in the converter number adjustment module according to the embodiment.

Moreover, the converter number adjustment module 41 causes the CaaS converter 42 to re-execute the job whose processing has become an error by the existing converter 120 to complete the processing. In this case, as illustrated in a flowchart in FIG. 19, the converter number adjustment module 41 refers to the job information table 37 illustrated in FIG. 8 and detects job information whose status is "error" (step S45). The converter number adjustment module 41 refers to the "result" of the detected job of the "error" from the job information table 37. The "result" has a record of the reason why the job has become an "error" as illustrated in Table 4 below.

TABLE 4

| Total file size | Number of files | Total number of pages | Reason at error |
|---|---|---|---|
| 10,245,327 | 3 | 37 | Memory_Empty |

For example, when the reason is a predetermined reason such as "insufficient remaining amount of memory", "memory leak", or "insufficient remaining amount of HDD" (step S46: Yes), the converter number adjustment module 41 activates the CaaS converter 42 of the processing corresponding to the job and re-executes the job in error (step S47).

Accordingly, the job whose processing by the existing converter 120 has become an error can be processed by the CaaS converter 42.

Schedule Activation Operation of CaaS Converter

Then, when it is known from the past record that the processing in the existing converter 120 stagnates, the converter number adjustment module 41 may periodically activate the CaaS converter 42 in accordance with the date and time. Such periodic activation processing of the CaaS converter 42 according to a schedule may be executed in combination with, for example, the rewrite processing for the setting file described with reference to FIG. 14 or FIG. 15.

Figure 20:
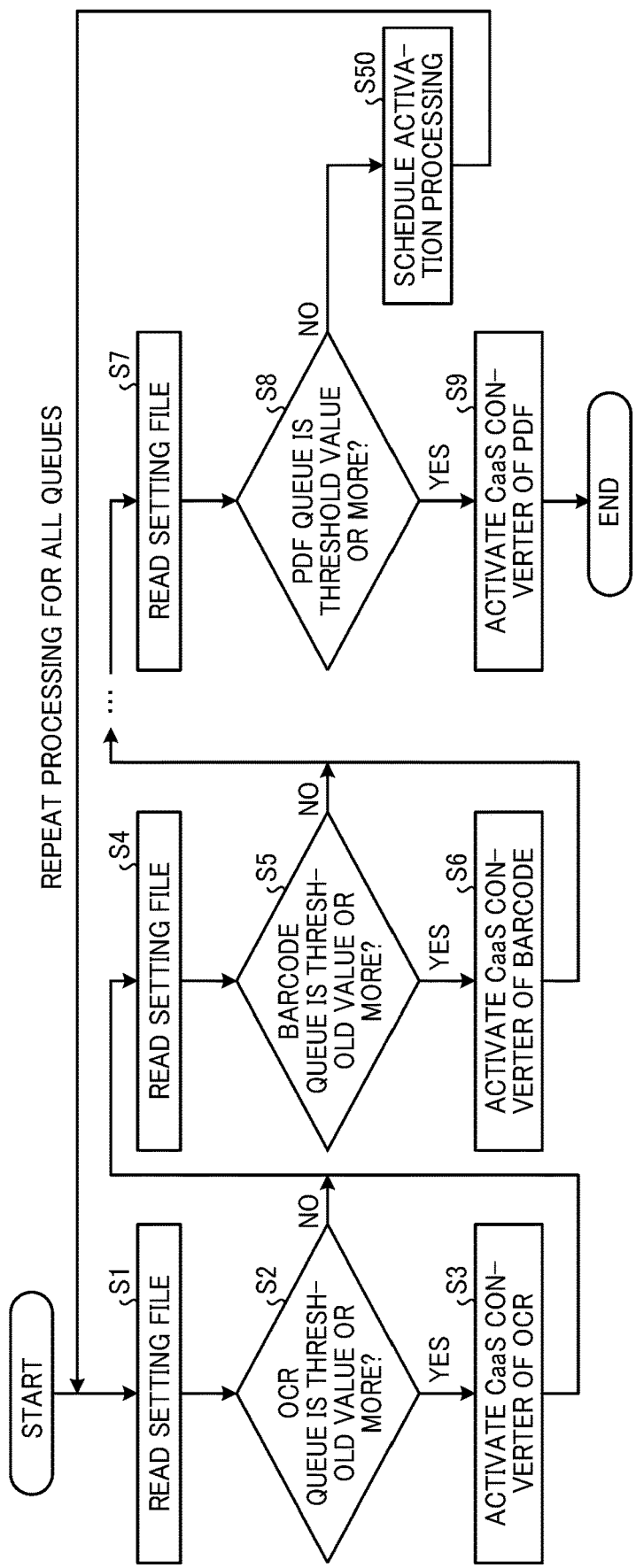
FIG. 20 is a flowchart illustrating a schedule activation operation of the CaaS converter by the converter number adjustment module according to the embodiment.

For example, it is assumed that it is known from the past record that a large number of jobs are entered during 9:00 to 10:00 on every Monday. In this case, a required number of CaaS converters 42 are activated in advance in the time zone to smoothly process a large number of jobs. Thus, as illustrated in step S50 of a flowchart in FIG. 20, a step of performing schedule activation processing of the CaaS converter 42 is provided. Then, at the date and time set in the schedule, the converter number adjustment module 41 activates the number of CaaS converters 42 set in the schedule.

Specifically, as illustrated in Table 5 below, the activation date and time, the processing to be activated, and the number of CaaS converters 42 to be activated are set in the setting file in advance. The step checks the date and time when a large number of jobs are entered or the date and time when jobs stagnate based on the past records, and sets the checked date and time in the setting file.

TABLE 5

| Activation date and time | Processing to be activated | Number of CaaS converters to be activated |
|---|---|---|
| 9:00-10:00 on weekday | OCR | 5 |
| 17:00-18:00 on every Friday | image2pdf | 3 |

The example of Table 5 illustrates setting to activate five CaaS converters 42 of the OCR processing during 9:00 to 10:00 on a weekday. The example in Table 5 illustrates setting to activate three CaaS converters 42 that perform the conversion processing of converting image information into PDF data during 17:00 to 18:00 on every Friday.

Figure 21:
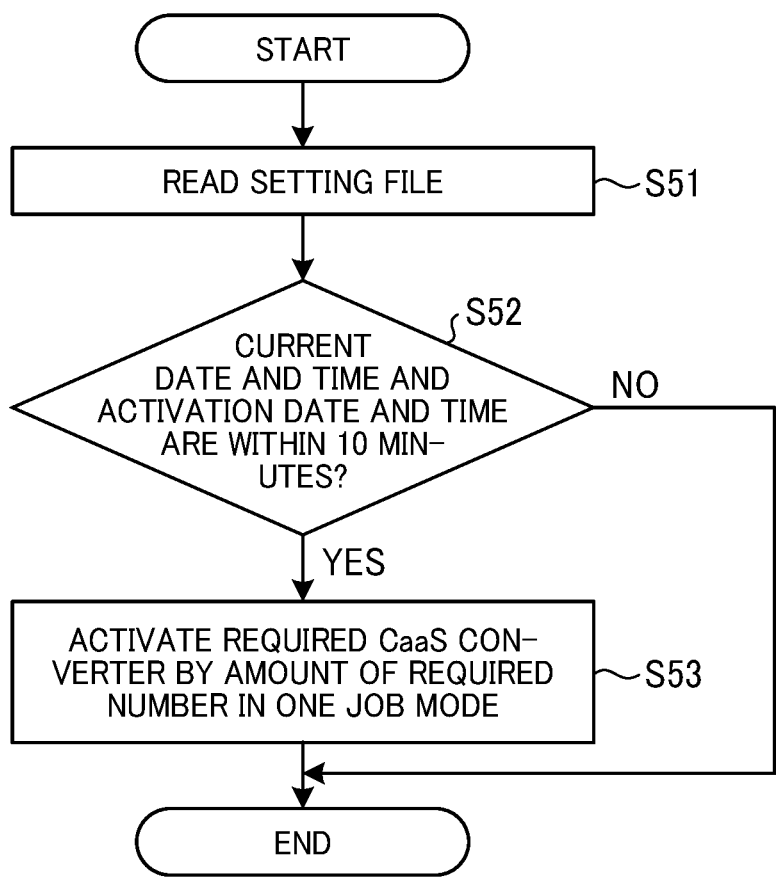
FIG. 21 is a flowchart illustrating in detail a flow of the schedule activation processing by the converter number adjustment module according to the embodiment.

FIG. 21 is a flowchart illustrating a flow of a specific operation of the schedule activation processing in step S50. Referring to FIG. 21, the converter number adjustment module 41 reads the setting file illustrated in Table 5 in step S51. The converter number adjustment module 41 determines whether the current date and time is, for example, within 10 minutes from the activation date and time of the CaaS converter 42 set in the setting file (step S52).

When the converter number adjustment module 41 determines that the current date and time is, for example, within 10 minutes from the activation date and time of the CaaS converter 42 set in the setting file (step S52: Yes), the processing proceeds to step S53. The converter number adjustment module 41 activates the CaaS converters 42 corresponding to the processing set in the setting file by the number set in the setting file (step S53).

One Job Mode

In this case, when the activated CaaS converter 42 does not have a queue to be processed, the converter number adjustment module 41 immediately ends the CaaS converter 42. However, in the case of the schedule activation processing, the number of CaaS converters 42 set based on the past record are activated. Even when a queue to be processed does not currently exist, a queue is likely to be entered within a set period. Thus, the converter number adjustment module 41 causes the CaaS converter 42 activated in the schedule activation processing not to end the processing until the processing on one queue is ended (one job mode).

The one job mode is a mode that is executed in the time zone set in the setting file, for example, during 9:00 to 10:00 on a weekday. While the converter number adjustment module 41 operates in the one job mode, the converter number adjustment module 41 polls the queue accumulated in the queue server device 32 at a predetermined time interval, and the CaaS converter 42 (or the existing converter 120) processes the entered queue. The converter number adjustment module 41 ends the one job mode when 10:00 is passed. When the one job mode is ended, the converter number adjustment module 41 also ends the CaaS converter 42 that is not processing a queue.

Thus, the CaaS converters 42 are activated by the required number on the date and time when a large number of jobs are entered or on the date and time when the processing of the jobs stagnate, and the processing of the jobs can be smoothly completed.

Automatic Past Record Check

Then, the record check to set the schedule for activating the CaaS converter 42 may be automatically performed by the converter number adjustment module 41 as illustrated in step S54 to step S56 of a flowchart in FIG. 22.

In this case, as illustrated in the flowchart in FIG. 22, when it is determined that the current date and time is not within, for example, 10 minutes from the activation date and time of the CaaS converter 42 set in the setting file in the above-described step S52 (step S52: No), the processing proceeds to step S54. In step S54, the converter number adjustment module 41 refers to the job information table 37 to count how many jobs have been processed in a predetermined unit time, such as a unit time of 1 hour or a unit time of 10 minutes, for each processing, such as the OCR processing or the barcode processing, from the entry date and time and the number of jobs (step S54).

Then, the converter number adjustment module 41 refers to the setting file illustrated in Table 2. The converter number adjustment module 41 detects a time zone in which a number of queues equal to or larger than the queue threshold value are processed, for example, five jobs or more in the case of the OCR processing, eleven jobs or more in the case of the barcode processing, or fifteen jobs or more in the case of the PDF conversion processing (step S55).

Then, the converter number adjustment module 41 sets, for the setting file, all the detected time zones, the date and time when the CaaS converters 42 are scheduled to be activated, the type of processing such as the OCR processing, and the number of CaaS converters 42 to be activated (step S56).

Accordingly, when the schedule is activated next time, the latest activation date and time, the type of processing, and the number of CaaS converters 42 to be activated are reflected, and the CaaS converters 42 can be activated in accordance with the schedule. That is, the schedule for activating the CaaS converter 42 can be automatically updated in accordance with the past processing record to perform the processing of a queue.

As it is clear from the above description, in the data conversion system 100 according to the present embodiment, the CaaS converter 42 is prepared as a Docker image in the CaaS container 40. When required, a Docker image is activated as a task to increase a CaaS converter 42 that performs the same processing as the existing converter 120 and to process the job. Accordingly, the number of CaaS converters 42 can be increased in accordance with the number of queues accumulated in the queue server device 32, and the accumulated queues can be processed. Thus, an inconvenience that it takes a long time to process a queue or a time-out error occurs can be prevented. Thus, an inconvenience that a job stagnates and causes an inconvenience to a customer can be prevented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above. Each of the functions of the described embodiments may be implemented by one or more processing circuits or circuitry.

Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A data conversion processing system, comprising:
a queue server configured to accumulate queues that specify data conversion processing to a different data format; and
circuitry configured to execute at least one existing converter that performs conversion of data specified by one or more of the queues, and a converter number adjustment module provided at a container as a user space on an operating system,
wherein the converter number adjustment module, in a case that a number of the queues equal to or larger than a threshold value are accumulated in the queue server, forms at least one virtual converter that performs data conversion processing at the container the same as the data conversion processing of the at least one existing converter, and performs the data conversion processing corresponding to the number of queues equal to or larger than the threshold value.

2. The data conversion processing system according to claim 1,
wherein the converter number adjustment module forms the at least one virtual converter based on an activation condition set in a setting file,
wherein the activation condition based on a past processing record of the data conversion processing is set in the setting file, the activation condition being successively corrected in accordance with the past processing record.

3. The data conversion processing system according to claim 1, wherein the converter number adjustment module periodically recognizes the number of the queues in the queue server, and determines whether the number of the queues in the queue server is equal to or larger than the threshold value.

4. The data conversion processing system according to claim 2, wherein at least an activation date and time is set as the activation condition in the setting file, and wherein the converter number adjustment module forms the at least one virtual converter at the activation date and time set in the setting file.

5. The data conversion processing system according to claim 4, wherein the converter number adjustment module sets in the setting file a time schedule which is detected based on the past processing record and in which processing by the at least one existing converter stagnates, as the activation date and time to form the at least one virtual converter.

6. The data conversion processing system according to claim 1, wherein, in a case that a queue whose data conversion processing by the at least one existing converter has stagnated for a predetermined time or more is accumulated in the queue server, the converter number adjustment module forms the at least one virtual converter and performs the data conversion processing corresponding to the queue whose processing has stagnated for the predetermined time or more.

7. The data conversion processing system according to claim 1, wherein, in a case that a queue whose data conversion processing by the at least one existing converter is in an error status is accumulated in the queue server, the converter number adjustment module forms the at least one virtual converter and performs the data conversion processing corresponding to the queue in the error status.

8. A data conversion processing method, comprising:
providing a queue server to accumulate queues that specify data conversion processing to a different data format;
executing at least one existing converter that performs conversion of data specified by one or more of the queues;
providing a converter number adjustment module at a container as a user space on an operating system; and
based on a determination that a number of the queues equal to or larger than a threshold value are accumulated in the queue server, the method further comprising:
forming at least one virtual converter that performs data conversion processing the same as data conversion processing of the at least one existing converter at the container using the converter number adjustment module, and performs the data conversion processing corresponding to the number of queues equal to or larger than the threshold value.

9. A non-transitory recording medium which, when executed by one or more processors, causes the processors to perform a data conversion processing method comprising:
providing a queue server to accumulate queues that specify data conversion processing to a different data format;
executing at least one existing converter that performs conversion of data specified by one or more of the queues;
providing a converter number adjustment module at a container as a user space on an operating system; and
based on a determination that a number of the queues equal to or larger than a threshold value are accumulated in the queue server the method further comprising:
forming at least one virtual converter that performs data conversion processing the same as data conversion processing of the at least one existing converter at the container using the converter number adjustment module, and performs the data conversion processing corresponding to the number of queues equal to or larger than the threshold value.

10. The data conversion processing system according to claim 1,
wherein the at least one existing converter polls the queue server at a predetermined time interval, and processes a queue in the queue server when the queue is present in the queue server.

11. The data conversion processing system according to claim 10,
wherein the at least one virtual converter looks at the queue server once, and when a queue to be processed is present in the queue server, the at least one virtual converter processes the queue, and disappears when the processing of the queue is completed.

12. The data conversion processing system according to claim 1,
wherein the converter number adjustment module forms a number of virtual converters corresponding to the number of the queues exceeding the threshold value.

13. The data conversion processing system according to claim 1,
wherein the converter number adjustment module forms a predetermined number of virtual converters when the number of the queues equal to or larger than the threshold value are accumulated in the queue server.

14. The data conversion processing system according to claim 1,
wherein the converter number adjustment module forms the at least one virtual converter based on a setting file that specifies the threshold value and a number of virtual converters to form.

15. The data conversion processing system according to claim 14,
wherein the converter number adjustment module rewrites the threshold value and the number of virtual converters to form for the data conversion processing in the setting file based on a past record check.

16. The data conversion processing method according to claim 8,
wherein forming the at least one virtual converter comprises forming a number of virtual converters corresponding to the number of the queues exceeding the threshold value.

17. The data conversion processing method according to claim 8,
wherein forming the at least one virtual converter comprises forming the at least one virtual converter based on a setting file that specifies the threshold value and a number of virtual converters to form.

18. The data conversion processing method according to claim 17,
wherein the method further comprises rewriting the threshold value and the number of virtual converters to form for the data conversion processing in the setting file based on a past record check.

19. The non-transitory recording medium according to claim 9,
wherein forming the at least one virtual converter comprises forming a number of virtual converters corresponding to the number of the queues exceeding the threshold value.

20. The non-transitory recording medium according to claim 9,
wherein forming the at least one virtual converter comprises forming the at least one virtual converter based on a setting file that specifies the threshold value and a number of virtual converters to form.

* * * * *